US006907601B1

(12) United States Patent
Hoflehner et al.

(10) Patent No.: US 6,907,601 B1
(45) Date of Patent: Jun. 14, 2005

(54) METHOD AND APPARATUS FOR INSERTING MORE THAN ONE ALLOCATION INSTRUCTION WITHIN A ROUTINE

(75) Inventors: Gerolf F. Hoflehner, Santa Clara, CA (US); James E. Pierce, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 470 days.

(21) Appl. No.: 09/608,313

(22) Filed: Jun. 30, 2000

(51) Int. Cl.[7] .............................................. G06F 9/45
(52) U.S. Cl. ...................... 717/151; 712/228; 711/147; 711/153
(58) Field of Search ................................ 717/140–144, 717/150–161; 711/147, 153, 173; 712/228

(56) References Cited

U.S. PATENT DOCUMENTS

| 5,367,684 A | * | 11/1994 | Smith | 717/140 |
| 5,748,963 A | * | 5/1998 | Orr | 717/131 |
| 5,950,228 A | * | 9/1999 | Scales et al. | 711/148 |
| 5,999,737 A | * | 12/1999 | Srivastava | 717/162 |
| 6,029,005 A | * | 2/2000 | Radigan | 717/158 |
| 6,230,317 B1 | * | 5/2001 | Wu | 717/161 |

OTHER PUBLICATIONS

Aho et al., "Compilers, Principles, Techniques, and Tools," 1988, Addison–Wesley–Longman, pp. 541–546.*
Nov. 1996, ACM Transactions on Programming Languages and Systems, vol. 18, No. 6, pp. 683–710.*
G.J. Chaitin, REgister Allocation & Spilling Via Graph Coloring, IBM Research, pp. 98–105, 1982, ACM 0–89791–074–5/82/006/0098.

Fred C. Chow, Minimizing Register Usage Penalty at Procedure Calls, MIPS Computer Systems, Inc. Proceedings of the SIGPLAN '88, Conference on Programming Language Design and Implementation, Atlanta, Georgia, Jun. 22–24, 1988, pp. 85–94.
David W. Wall, Register Windows vs. Register Allocation, Digital Equipment Corporation, Western Researcch Laboratory, Proceddings of the SIGPLAN '88, Conference on Programming Language Design and Implementation, Atlanta, Georgia, Jun. 22–24, 1988, pp. 67–78.
Preston Briggs, Register Allocation via Graph Coloring, Rice University, A Thesis Submitted In Partial Fulfillment Of The Requirements For The Degree, Doctor of Philosophy, Houston Texas, Apr. 1992, 154 Pages.

* cited by examiner

Primary Examiner—John Chavis
Assistant Examiner—Lawrence J Shrader
(74) Attorney, Agent, or Firm—Blakely, Sokoloff, Taylor & Zafman LLP

(57) ABSTRACT

A method is described comprising inserting an allocation instruction within a routine if a function call instruction is found within the routine. Another method is described comprising inserting multiple allocation instructions within a routine by searching for one or more functional characteristics within the routine and inserting an allocation instruction within the routine if a functional characteristic is discovered. Another method is described comprising performing a first allocation for a first amount of register space at the entry block of a routine and then performing a second allocation for a second amount of register space for the live information within the routine at the time of the second allocation. Then, performing a function call to a second routine and performing a third allocation for a third amount of register space at the entry block of the second routine, the third amount of register space and the first amount register space having a common register.

80 Claims, 19 Drawing Sheets

METHOD AND APPARATUS FOR INSERTING MORE THAN ONE ALLOCATION INSTRUCTION WITHIN A ROUTINE

FIELD OF THE INVENTION

The field of invention of relates to compiler technology in general; and, more specifically, to a method and apparatus for inserting more than one allocation instruction within a routine.

BACKGROUND

Subroutines

Frequently, a software program depends upon a subroutine in order to perform one or more operations. For example, a spreadsheet program may depend upon a "multiply" subroutine to multiply spreadsheet entries and/or depend upon an "add" subroutine to add spreadsheet entries. Typically, a subroutine: 1) accepts one or more existing variables as inputs; 2) performs its function in light of these inputs; and 3) returns one or more output values (i.e., responds with the result(s) of the subroutine function).

A subroutine is "called" upon (also referred to as a "function call") by another routine when needed. Thus, a subroutine may also be referred to as a called routine. The routine that calls the subroutine may be referred to as a caller routine. Each subroutine typically has a unique name. Thus, for example, a statement "CALL foo(x,y)" within a caller routine indicates that a subroutine named "foo" is being called. A subroutine typically accepts its input values when it is called. After the subroutine has finished its operation, it presents its output back to the caller routine. This activity may be referred to as a "return" or "function return".

The manner in which a program uses its subroutines may be expressed in a call graph, an example of which is shown in FIG. 1. A call graph represents the flow of a program as a network 100 where routines are represented as network nodes. For example, as seen in FIG. 1, routines named "foo(x,y)", "bar(x,y)", "foobar(x,y)", and "main(x,y)" exist at nodes 101, 102, 103, and 104 respectively.

An arrow into a routine represents the start of operation for the particular routine. Thus, an arrow into a subroutine (e.g., arrow 151) represents a function call of the subroutine and an arrow from a subroutine (e.g., arrow 152) represents a return by the subroutine. Note that as mentioned above a subroutine may depend upon and call another subroutine. Thus, as seen in FIG. 1, subroutine "bar(x,y)" 102 calls upon subroutine "foobar(x,y)" 103 as represented by arrow 153.

Control Flow Graph Representation of a Routine

Referring to FIG. 2, a "control flow graph" breaks down a routine into a network 200 of basic blocks where the network reflects the overall flow of the routine. Basic blocks 201 through 208 are represented as nodes within the control graph 200 example shown in FIG. 2. A basic block is a collection of processor instructions (that are typically ordered in series according to the sequence in which they will be executed).

When the instructions within a basic block are executed, the routine effectively progresses through a portion of its function. For example, while the instructions of basic block 207 are being executed, the program may be performing a calculation or making some form of determination. The flow of the routine is accomplished by effectively "hopping" from node to node (i.e., basic block to basic block) according to the directions provided by the control graph.

Typically, a basic block terminates with or a "program branch" type or instruction. Thus, each basic block typically represents a collection of instructions that are executed until a "branch" is reached in the program. For simplicity, function calls and function returns for a subroutine are not represented as branch statements in this description, although they may be viewed as such in actual practice.

When the program reaches a "branch", the basic block terminates and the program "jumps" to the next basic block pointed to by the control flow graph. The next basic block represents the next portion of instructions that the program executes as a result of the branch. In this manner, the processor executes instructions in the sequence mandated by the subroutine's control flow graph.

SUMMARY OF INVENTION

A method is described comprising inserting an allocation instruction within a routine if a function call instruction is found within the routine.

BRIEF DESCRIPTION OF THE DRAWINGS

The present invention is illustrated by way of example, and not limitation, in the Figures of the accompanying drawings in which.

DETAILED DESCRIPTION

Figure 1:
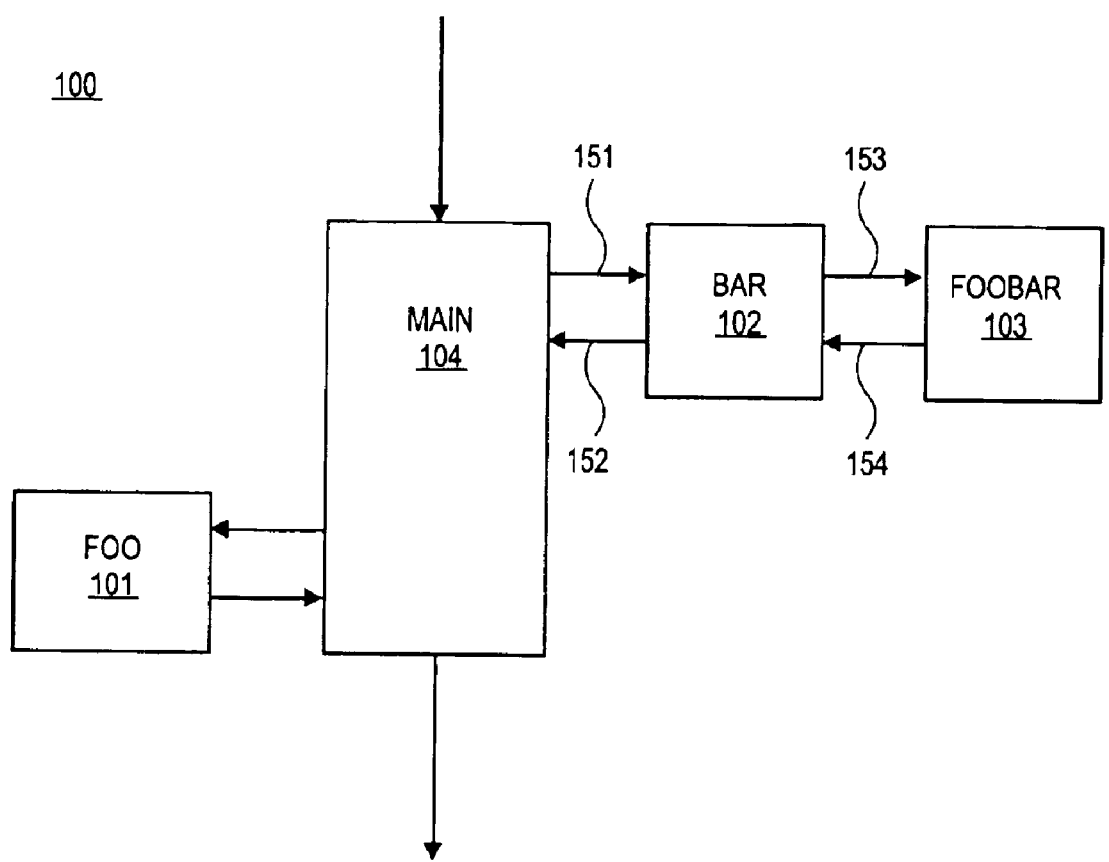
FIG. 1 shows an example of a call graph.

A method is described comprising inserting an allocation instruction within a routine if a function call instruction is found within the routine. Another method is described comprising inserting an allocation instruction within a routine by searching for one or more functional characteristics within the routine and inserting an allocation instruction within the routine if a functional characteristic is discovered. Another method is described comprising performing a first allocation for a first amount of register space at the entry block of a routine and then performing a second allocation for a second amount of register space for the live information within the routine at the time of the second allocation. Then, performing a function call to a second routine and performing a third allocation for a third amount of register space at the entry block of the second routine, the third amount of register space and the first amount register space having a common register.

Embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense.

Compilers and Register Allocation

Two formats are commonly used to store a program: source code and machine code. Source code records a program in a language a programmer understands (e.g, C or C++) while machine code records a program in a language a processor understands. Since processors are designed to understand instructions that are fed to them, machine code format may be viewed as an organized record of those instructions used to implement a routine upon a processor.

Because a control flow graph shows the organization of the sequences of instructions used to implement a routine, a control flow graph (such as control flow graph 200 of FIG. 2) is a representation of a routine's machine code. Compilers are used to translate a software from its source code to its machine code. Associated with the translation performed by a compiler is the allocation of registers.

Registers are storage resources used by a processor to execute its instructions. For example, for an "ADD" processor instruction that adds two variables "x" and "y" (and then presents the summation as variable "z"), a processor may access the input variable x from a first register and access the input variable y from a second register before performing the "ADD" instruction. After the "ADD" instruction is performed, the output variable z may be stored in a third register.

Compilers are designed to produce machine code that reserves a sufficient number of register locations for its subsequent processor instructions. That is, a routine's machine code will "set up" registers for a processor to use before the processor executes the instructions that actually use them. Note that register allocation may be performed explicitly by the execution of a processor instruction designed to preserve register space or implicitly by software conventions. An example for an explicit instruction includes the "ALLOC" instruction associated with the instruction set of the IA-64 processor family developed by Intel Corporation of Santa Clara, Calif.

Referring back to FIG. 1, recall that a program may be expressed as a call graph 100 having nodes representative the routines 101, 102, 103, 104 within the program. An active routine corresponds to a routine currently being utilized by the program. Thus, when subroutine "bar(x,y)" 102 is called upon by main routine 104, subroutine "bar(x, y)" is active. When subroutine "bar(x,y)" 102 calls upon subroutine "foobar(x,y)" 103, both subroutine "bar(x,y)" 102 and subroutine "foobar(x,y)" 103 are active. After subroutine "foobar(x,y)" 103 presents its result to subroutine "bar(x,y)" 102, subroutine "foobar(x,y)" 103 is no longer active.

A routine that is called upon (i.e., becomes active) will attempt to allocate register space for the variables or other data structures (either of which may be referred to as "information") that it uses during the course of its flow. Typically, a called routine has an allocation instruction located within its first basic block (e.g., basic block 201 of the control flow graph seen in FIG. 2) that allocates enough registers for the routine to execute along a worst case path (i.e., a path through the control flow graph that uses the most registers). Because each called routine executes its own allocation instruction, as the number of active routines increases the number of allocated registers increases.

A problem associated with prior art compiler technology involves the manner in which registers are allocated for more than one active routine. Prior art techniques allocate registers only once per routine at the start of a routine. That is, referring to FIG. 2, a prior art technique will insert an allocation instruction into the first basic block of the routine 201 (which may also be referred to as the entry block). As a result, the single allocation instruction must allocate enough registers for the "worst case" path through the routine (i.e., the path that uses the most registers).

For example, if path 240 uses 80 registers, path 250 uses 85 registers, path 260 uses 90 registers and path 270 uses 90 registers, the compiler will insert an allocation instruction in the entry block 201 that allocates 90 registers for the routine. If the routine actually follows path 240 it will have allocated 10 unused registers (since 90 registers were allocated and only 80 were used).

Allocating for worst case conditions is necessary because of the temporal perspective of the allocation instruction. That is, as of the entry block 201 (which corresponds to the location of the allocation instruction), the particular path that the routine will follow is not yet determinable. Therefore, the routine can only ensure that enough registers are allocated in the event that the routine happens to follow the worst case path 270.

Figure 3:
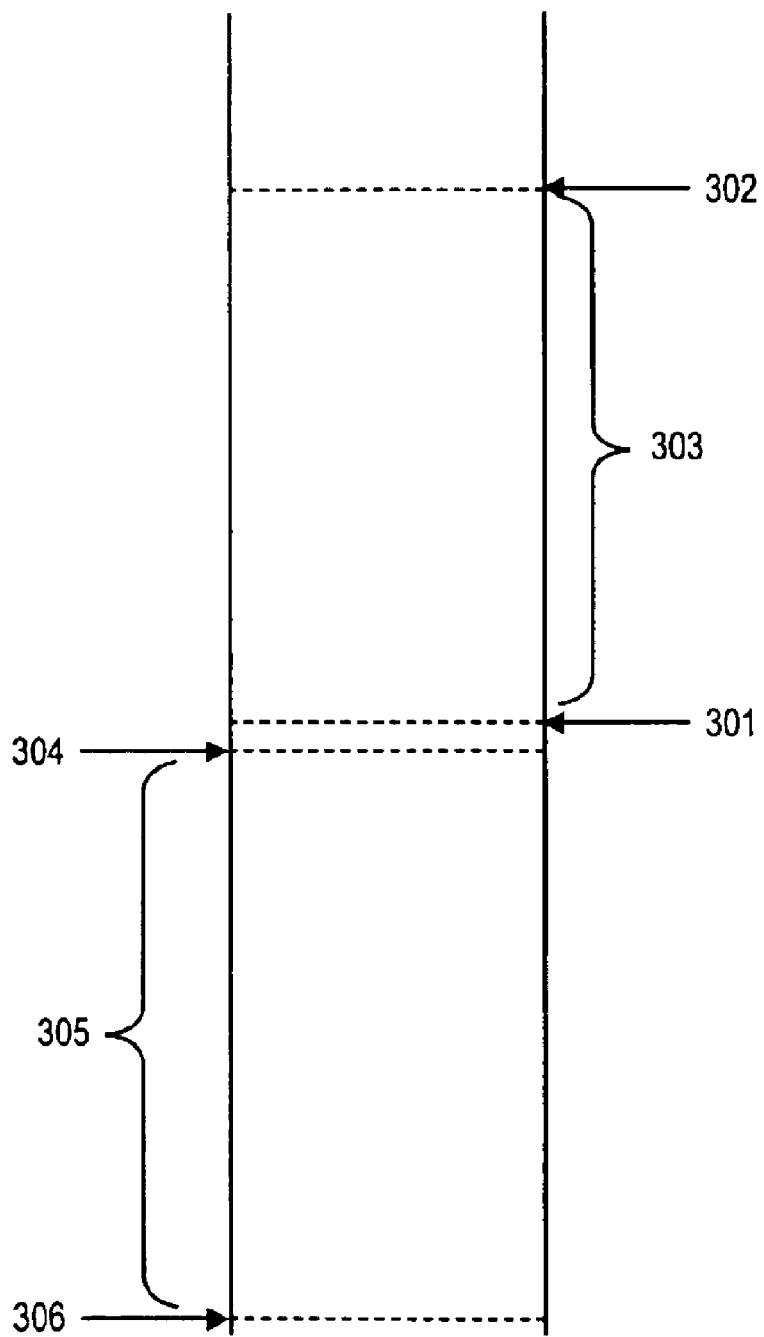
FIG. 3 shows an example of a prior art function call.

FIG. 3 shows a depiction of the manner in which an allocation instruction reserves registers. An allocation instruction allocates registers for the routine having the instruction. For example, if routine bar(x,y) executes an allocation instruction for 30 registers, 30 registers will be made available for the use of the bar(x,y) routine. An allocation instruction starts with a current base register 301 and establishes a ceiling register 302. The difference 303 between the ceiling register 302 and the base register 301 corresponds to the number of allocated registers the routine is free to use.

For a routine, the current base register 301 is the register above (i.e., the next register after) the ceiling register 304 of the previously executed allocation instruction for a previously allocated routine. Because prior art techniques have one allocation instruction per routine, FIG. 3 can be used to discuss the manner in which registers are allocated during a function call. That is, register space 303 corresponds to the registers used by the called routine and register space 305 corresponds to the registers used by the caller routine.

Furthermore, because prior art techniques allocate enough registers for the worst case register usage of an entire routine, the ceiling register 304 of the caller routine (the next register above which corresponds to the base register 301 for the called routine) is an amount of registers 305 above the base register 306 of the caller routine equal to the worst case register usage of the caller routine. Similarly, the amount of registers 303 allocated by the called routine corresponds to the worst case register usage of the called routine.

As an example, referring to FIGS. 1 and 3, if the worst case register consumption of the foobar(x,y) routine 103 of FIG. 1 is 50 registers, the allocation instruction within the foobar(x,y) routine will allocate 50 registers (for the use of the foobar(x,y) routine) starting with the current base register 301 of FIG. 3. The current base register 301 for the foobar(x,y) 103 routine allocation instruction is the register above the ceiling register 304 of the previous allocation instruction (which corresponds to the ceiling register 304 of the foo(x,y) routine 102).

If the ceiling register 304 of the foo(x,y) routine corresponds to the $56^{th}$ register within a stack of "on processor" registers, the current base register 301 for the foobar(x,y) routine is the $57^{th}$ "on processor" register and the ceiling register 302 for the foobar(x,y) routine is the $106^{th}$ "on processor" register. The foobar(x,y) routine is therefore free to use registers 57 through 106, which correspond to the 50 registers 303 that were allocated for the foobar(x,y) routine by the allocation instruction.

As more routines become active and the allocation space reserved for each routine corresponds to its worst case register usage, "on processor" registers are rapidly consumed. In many cases where the number of allocated, unused registers is high (e.g., each active routine follows "best case" control flow paths having minimal register usage), the processor operates at reduced efficiency because the processor has to use off processor registers (e.g., SRAM or DRAM memory cells external to the processor) even though the number of actually used registers is less than an or equal to the number of on processor registers.

The use of off processor registers slows down the operation of the processor because: 1) access times to/from off processor registers are typically longer than access times to/from on processor registers; and/or 2) the use of off processor registers invokes the use of additional functionality (e.g., another routine that allows active routines to use off processor registers) which adds additional overhead for the processor.

Multiple Allocation Instructions Per Routine

A solution to the problem discussed above involves the insertion of multiple allocation instructions within a routine. A routine having multiple allocation instructions can be configured to allocate registers at one or more locations beyond the entry block of the routine. This effectively allows the routine to allocate registers on an approximately "as needed" basis as the routine progresses through whichever control flow path it happens to follow.

A routine can therefore allocate less than the "worst case" amount of registers for paths not corresponding to a worst case path. Likewise, a routine may be configured to allocate the "worst case" amount of registers only if the routine actually follows the worst case path. Also, as discussed in more detail below, the ability to insert an allocation instruction in a location other than the entry block of a caller routine creates an ancillary advantage where the register space holding the useless information of a caller routine may be re-allocated for the use of the called routine.

Figure 4A:
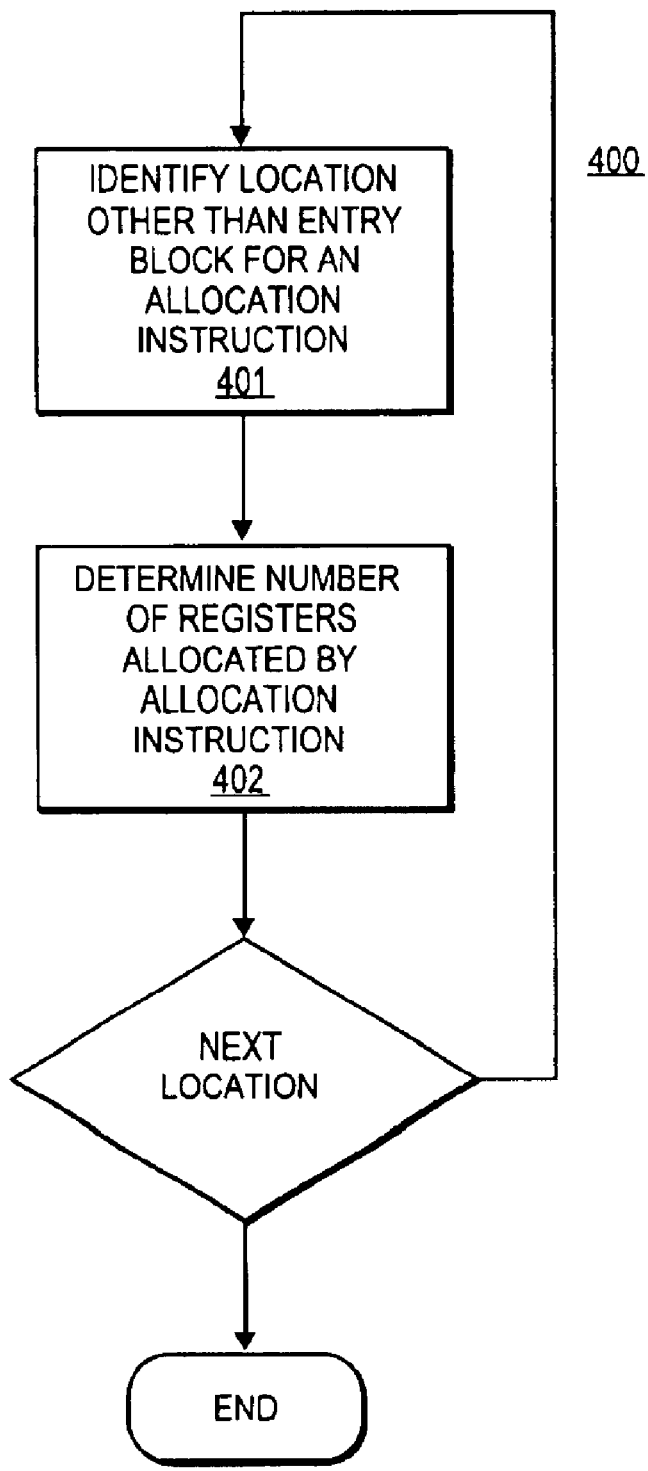
FIG. 4a shows a method that may be used to insert multiple allocation instructions within a routine.

FIG. 4a shows a method 400 that may be used by a compiler to configure a routine so that it allocates one or more registers with an allocation instruction located in a basic block other than the entry block. First, a location is identified 401 for the placement of an allocation instruction. Then, the number of registers the allocation instruction will allocate is determined 402. The sequence is repeated for each location within the routine where an allocation instruction is to be placed.

Various degrees of resolution or granularity may be used in determining 401 how many allocation instructions are to be used within a particular routine. In one embodiment, every basic block has an associated allocation instruction. For example, referring to the control flow graph of FIG. 2, basic block 201, 202, 203, etc. each have an allocation instruction that allocates sufficient registers for its corresponding basic block. In this case, the routine allocates registers almost exactly "as needed". That is, the degree of granularity or resolution of allocation instructions is very high resulting in a high density of allocation instructions within the routine.

Such a high degree of granularity may be inefficient for various applications because the execution of each allocation instruction corresponds to an amount of time where the processor is not substantively processing information. That is, each allocation instruction may be viewed as an amount of overhead the processor has to overcome in order to execute the routine. The more allocation instructions inserted within a routine, the more associated overhead the routine possesses.

Figure 2:
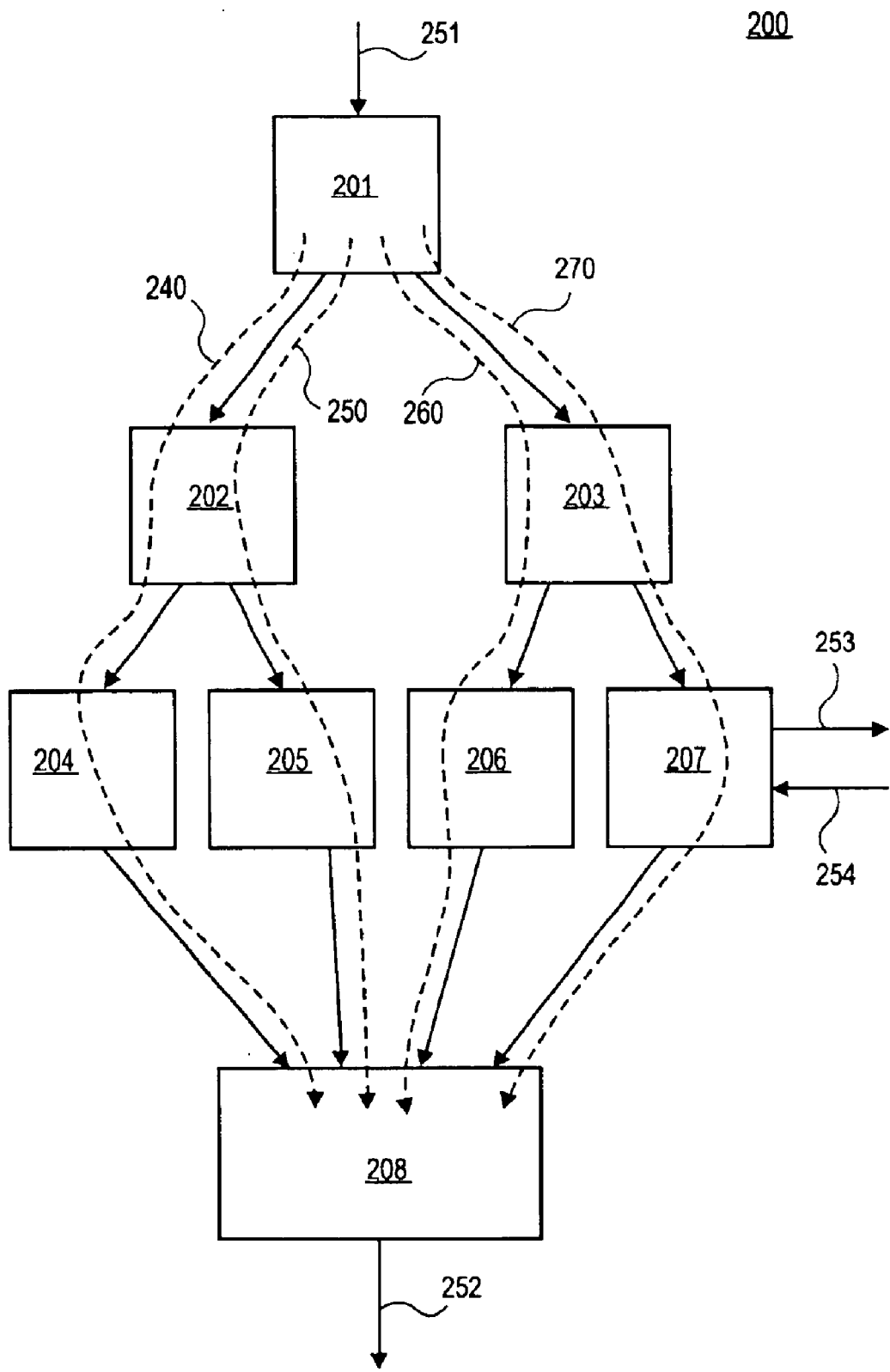
FIG. 2 shows an example of a control flow graph.

For example, referring again to the control flow graph of FIG. 2, if allocation instructions are inserted only in the entry block 201, basic block 202 and basic block 203, the routine only has to execute two allocation instructions regardless of the path followed. This reduces overhead as compared to the above-described approach where an allocation instruction is inserted in every basic block. Note that the allocation instruction inserted in basic block 202 should allocate sufficient registers for the worst case path that flows from it.

For example, if basic block 204 consumes more registers than basic block 205, the allocation instruction within basic block 202 should allocate enough registers for basic block 204 and 208. Furthermore, if the allocation instruction is placed at the beginning of basic block 202, the allocation instruction should allocate enough registers for basic blocks 202, 204 and 208. If, however, the allocation instruction is inserted at the end of basic block 202, the allocation instruction need only allocate sufficient registers for basic blocks 204 and 208.

Two aspects are worth brief discussion from the prior paragraph. First, note that an allocation instruction may be placed anywhere within a basic block. If an allocation instruction is inserted in a basic block location other than the first instruction location in the basic block, the instructions within the basic block that are executed before the allocation instruction should be allocated for by a previous allocation instruction.

Second, note that as the degree of granularity of instructions within a routine decreases (i.e., fewer allocation instructions are inserted within a routine), the allocation instructions begin to increase the number of registers they allocate. This results from the fact that: 1) the control flow path length between consecutive allocation instructions begins to increase; and 2) each allocation instruction allocates for the worst case register usage path that flows from the allocation instruction.

The prior art technique of inserting one allocation instruction per routine may be viewed as being positioned at the extreme end of this trend because one allocation instruction per routine corresponds to the lowest possible degree of granularity. As such the control flow path length is a maximum (extending from entry block 201 to exit block 208 in the control flow graph of FIG. 2) and the number of registers allocated for is a maximum (the worst case register usage of the entire routine).

Assuming that inserting an allocation instruction in every basic block will produce too much overhead and realizing that inserting only one allocation instruction per routine consumes too much register space, more favorable degrees of granularity are more likely to be somewhere in between these two extremes. As such, a compiler may be designed to search for or otherwise identify specific functional characteristics within a routine, the presence of which triggers the insertion of an allocation instruction. A functional characteristic is a specific feature of a control flow graph (e.g., a loop as discussed below); a specific type of instruction (e.g., a function call instruction as discussed below); or a specific grouping or series of instructions (e.g., a software pipelined loop as discussed below).

Figure 4B:
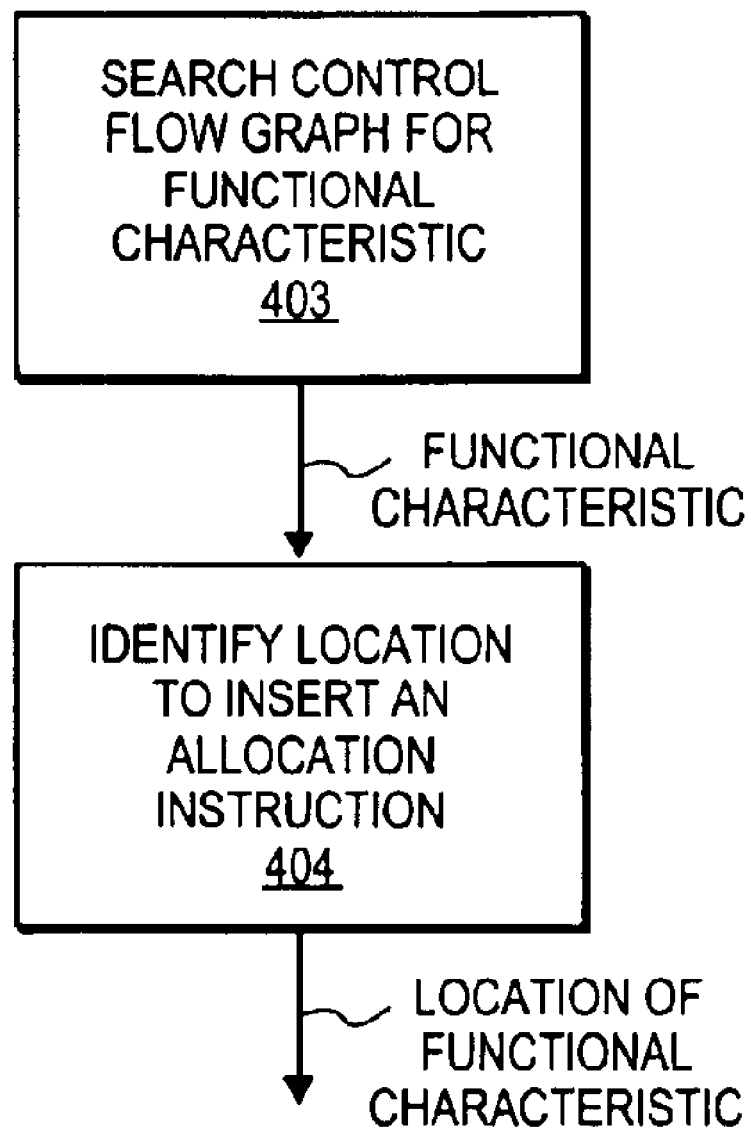
FIG. 4b shows a method that may be used to determine a location for placement of an allocation instruction.

As such, the first process 401 of FIG. 4a may be implemented with the routine of FIG. 4b. The routine of FIG. 4b: 1) effectively searches 403 over the control flow graph of a routine looking for one or more specific functional characteristics; and 2) identifies 404 a location within the routine where an allocation instruction should be inserted into the routine. After the location is identified 404, returning to FIG. 4a, the amount of registers to be allocated at the identified location is determined 402. The sequence is then repeated until the entire routine has been searched and each applicable functional characteristic.

In one approach, a function call corresponds to a functional characteristic that triggers the insertion of an allocation instruction. An allocation instruction placed within a basic block (other than the entry block of a routine) in light of the existence of a function call may be referred to as a function call allocation instruction. In another approach a loop within the control flow graph corresponds to a functional characteristic that triggers the insertion of an allocation instruction. An allocation instruction placed within a basic block (other than the entry block of a routine) in light of the existence of a loop within the control flow of a routine may be referred to as a loop allocation instruction.

In another approach, a software pipelined loop corresponds to a functional characteristic that triggers the insertion of an allocation instruction. An allocation instruction placed within a basic block (other than the entry block of a routine) in light of the existence of a software pipelined loop may be referred to as a software pipelined loop allocation instruction. In still other approaches, allocation instructions are inserted in light of multiple function exits. In various other approaches, combinations of some or all of the above functional characteristics trigger the placement of an allocation instruction within a single routine. A discussion of each of these functional characteristics immediately follows.

a. Function Call Allocation Instruction

Recall from above that an allocation instruction placed within a basic block (other than the entry block of a routine) in light of the existence of a function call may be referred to as a function call allocation instruction. A function call allocation instruction, being inserted in a basic block other than the entry block of a routine, may allow a routine to allocate instructions on an approximately "as needed" basis as discussed above.

A function call allocation instruction also provides the aforementioned ancillary advantage where the register space holding the useless information of a caller routine may be re-allocated for the use of the called routine. Stated another way, referring to FIG. 5, the register space 503 allocated for the use of the called routine overlaps register space 505 previously allocated for the use of the caller routine. Note that this is equivalent to the current base 501 of a called routine being effectively lowered (as compared to the prior art technique of FIG. 3) such that it falls within the register space 505 previously allocated to the caller routine.

Proportionally, register space 504a corresponds to the amount of previously allocated caller routine information that is no longer useful to the caller routine after the function call allocation instruction is executed. Register space 504b is the information allocated by the function call allocation instruction and corresponds to the information that is or may be useful to the caller routine after the function call allocation instruction is executed. Information that is not useful to the caller routine may be referred to as "stale" information while information that is or may be useful to the caller routine may be referred to as "live" information.

Figure 5:
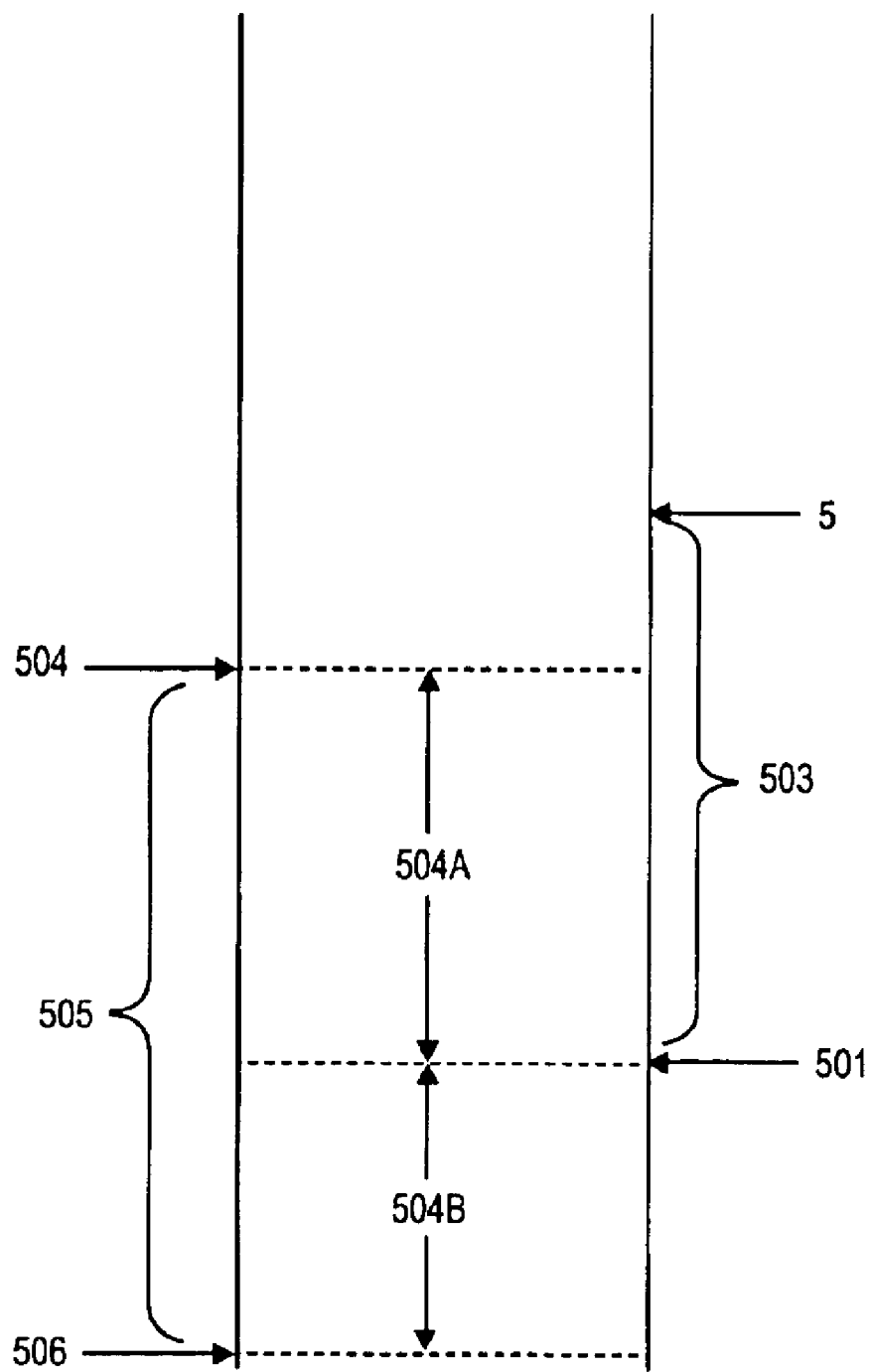
FIG. 5 shows an example of function call.
Figure 6:
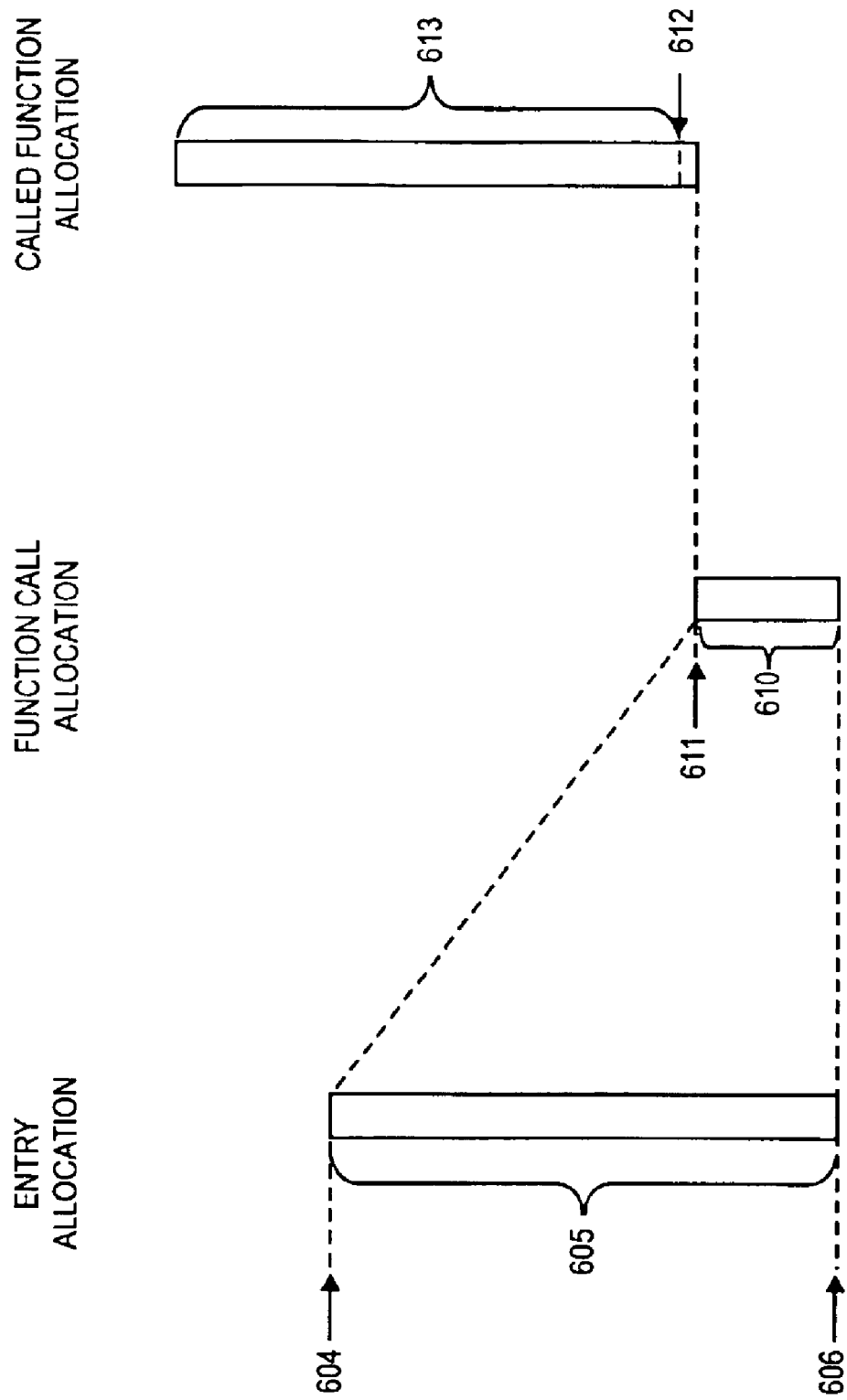
FIG. 6 shows the function call of FIG. 5 in more detail.

FIG. 6 shows the manner in which a function call allocation instruction provides the ancillary advantage of allowing a called routine to use the stale registers of the caller routine as discussed with respect to FIG. 5. The discussion surrounding FIG. 6 uses the call graph of FIG. 1 and the control flow graph of FIG. 2 for additional support; thus FIGS. 1, 2 and 6 should be presently referred to. Assume the control flow graph 200 of FIG. 2 corresponds to the "bar (x,y)" routine 102 shown in the call graph 100 of FIG. 1. Thus arrows 251 and 252 of FIG. 2 correspond to arrows 151 and 152 of FIG. 1. Assume basic block 207 of FIG. 2 contains the function call instruction to the "foobar(x,y)" routine 103 of FIG. 1 (thus arrows 253 and 254 correspond to arrows 153 and 154 of FIG. 1).

Assume the caller routine bar(x,y) has an allocation instruction in its entry block 201 that allocates enough registers for the worst case register usage of the foo(x,y) routine. Note that such an allocation instruction is possible in a routine having multiple allocation instructions (such as the caller routine foo(x,y) presently being discussed). That is, although the inefficient prior art techniques have been partially characterized as: 1) having an allocation instruction in the entry block 201; and 2) allocating for worst case register usage in the entry block; it is important to point out that both of these characteristics may exist in approaches utilizing a multiple allocation instructions per routine approach. An explanation as to both of these characteristics follows.

First, although prior art techniques employ an allocation instruction within the entry block of a routine, the problem associated with the prior art relates mostly to the fact that there is only one allocation instruction per routine. As discussed, this forces the routine to permanently consume the worst case amount of register space.

However, a purpose of an allocation instruction that is inserted within the entry block of a routine is to allocate registers for at least the initial instructions of the routine (e.g., instructions within entry block 201 and perhaps basic blocks that follow it). Because any routine should allocate for its initial instructions, an allocation instruction may be inserted within the entry block 201 of a routine having multiple allocation instructions.

Second, as discussed, a routine having multiple allocation instructions can allocate instructions on an approximately "as needed" basis. This allows an allocation instruction within an entry block to allocate less than the worst case register usage for the routine. For example, referring to FIG. 2, if there are allocation instructions within basic blocks 201, 202 and 203; the allocation instruction in the entry block 201 only needs to allocate for the instructions that are executed within the entry block 201 (because the allocation instructions in basic blocks 202 and 203 can allocate for instructions that are executed subsequent to those within the entry block 201).

However, a routine having multiple allocation instructions may still be configured to allocate for worst case register usage in the entry block 201. For example, a multiple allocation instruction routine may be configured to utilize only the ancillary advantage (in which a called routine uses the stale registers of the caller routine). As such, the routine does not allocate registers on an "as needed" basis.

A caller routine represented by the control flow graph of FIG. 2 may be so configured by: 1) inserting a function call allocation instruction just before each function call made by the routine (e.g., in basic block 207); and 2) inserting an allocation instruction that allocates for the worst case register usage of the entire routine in the entry block 201.

In this configuration, enough registers are allocated by the allocation instruction in the entry block 201 to accommodate a worst case path (e.g., path 250). Furthermore, the function call allocation instruction inserted just before the function call (e.g., in basic block 207) allows the called routine to utilize the stale registers of the caller routine (as described in more detail below). Thus, the routine has multiple allocation instructions (one in the entry block 201 and one in basic block 207) yet also has an allocation instruction in the entry block 201 that allocates for worst case register usage. The difference in performance between such a configuration and a prior art configuration is that the prior art configuration does not utilize the ancillary advantage.

Understanding then that a routine having multiple allocation instructions may still possess an allocation instruction in the entry block that allocates for the worst case register usage of the routine, the discussion may now progress back to its original intention. That is, a discussion relating to FIGS. 1, 2, and 6 directed to the manner in which a function call allocation instruction provides the ancillary advantage of allowing a called routine to use the stale registers of the caller routine as discussed with respect to FIG. 5.

Recalling that FIG. 6 uses the call graph of FIG. 1 and the control flow graph of FIG. 2 for additional support. Assume again that the control flow graph 200 of FIG. 2 corresponds to the "bar(x,y)" routine 102 shown in the call graph 100 of FIG. 1. Thus arrows 251 and 252 of FIG. 2 correspond to arrows 151 and 152 of FIG. 1. Assume basic block 207 of FIG. 2 contains the function call instruction to the "foobar (x,y)" routine 103 of FIG. 1 (thus arrows 253 and 254 correspond to arrows 153 and 154 of FIG. 1).

Assume the caller routine bar(x,y) has an allocation instruction in its entry block 201 that allocates enough registers for the worst case register usage of the foo(x,y) routine. That is, assume that the caller routine foo(x,y) operates according to the configuration discussed just above: 1) there is an allocation instruction inserted just before the function call in basic block 207; and 2) there is an allocation instruction in the entry block 201 that allocates for the worst case register usage of the entire routine.

Thus, in this example, the caller routine bar(x,y) is configured to utilize the ancillary advantage rather than allocate registers on an "as needed" basis. FIG. 6 shows the worst case amount of registers 605 allocated by the caller routine. In this example, these registers 605 are analogous to registers 305 in FIG. 3 and 505 in FIG. 5. The registers begin allocation at the base register 606 of the caller routine.

The ceiling register 604 of the caller routine is above its base register 606 by an amount 605 corresponding to the worst case register usage of the caller routine. In this example, ceiling register 604 is analogous to ceiling register 304 in FIG. 3 and ceiling register 504 in FIG. 5. After the execution of the allocation instruction within the entry block 201 that allocates register space 605, the caller routine bar(x,y) is prepared to follow any path in the control flow graph 200.

If the caller routine happens to follow path 270, a function call to the foobar(x,y) routine will be executed in basic block 207. As discussed above, the bar(x,y) caller routine is configured to have a function call allocation instruction just before the function call to the foobar(x,y) routine. For example, the routine may have a sequence of instructions such as:

Alloc(#);
Call(Foobar(x,y));

where "#" corresponds to the number of registers allocated by the function call allocation instruction.

If two consecutive allocation instructions executed within a routine allocate a different amount of registers, the ceiling register of the routine will change from the first instruction to the second instruction. For example, if the base register for a routine is the $56^{th}$ register and a first allocation instruction that allocates 30 registers will set the ceiling register at the $85^{th}$ register. Until the next allocation instruction is executed by the routine, the routine is free to use any of the registers between the $56^{th}$ and $85^{th}$ registers, inclusive.

If another allocation instruction is subsequently executed by the routine that allocates 15 registers, the ceiling register will be lowered to the $70^{th}$ register. Until the next allocation instruction is executed by the routine (if any), the routine is free to use any of the registers between the $56^{th}$ and $70^{th}$ registers, inclusive. Thus, in this example, the ceiling register has been lowered from the $85^{th}$ register to the $70^{th}$ register.

A function call allocation instruction operates similar to the second allocation instruction described above. That is, a function call allocation instruction allocates less registers than previously executed allocation instruction. In so doing, a function call allocation instruction lowers the ceiling register of the caller routine. Thus, referring to FIG. 6, because the amount of register space 610 allocated by the function call allocation instruction is less than the amount of register space 605 allocated by the allocation instruction in the entry block 201, the ceiling register of the caller routine 611 is lowered after execution of the function call allocation instruction.

After the execution of the function call allocation instruction, the subroutine foobar(x,y) is called. Because a called routine will set its base register as the register above the ceiling register of the caller routine, the foobar(x,y) routine will set its base register 612 just above the ceiling register 611 that was newly established by the execution of the function call allocation instruction.

Comparing FIG. 6 with FIG. 5, note that the register space 503, 613 allocated for the use of the called routine overlaps the register space 505, 605 previously allocated for the use of the caller routine. This activity is equivalent to the current base 501, 612 of a called routine being effectively lowered (as compared to the prior art technique of FIG. 3) such that it falls within the register space 505, 605 previously allocated to the caller routine.

The function call allocation instruction, having a different temporal perspective than the allocation instruction inserted in the entry block, does not need to allocate register space for stale information such as variables or other data structures that have outlived their usefulness within the caller routine or were allocated for but do not serve a useful purpose within the caller routine. A variable only used before the function call allocation instruction is an example of the former, and a variable used only on a control flow path alternative to the one currently followed is an example of the later.

The register space 610 allocated by the function call allocation instruction therefore corresponds to the live information within the caller routine at the time the function call allocation instruction is executed. Because the function call allocation instruction is executed just before the function call in the example being described, the register space 610 allocated by the function call allocation instruction in FIG. 6 also corresponds to the live information within the caller routine at the time the function call is made.

Referring back to FIG. 4a, recall that FIG. 4a shows a method 400 that may be used by a compiler to configure a routine so that it allocates one or more registers with an allocation instruction located in a basic block other than the entry block. First, a location within a basic block other than the entry block is identified 401 for the placement of an allocation instruction. Then, the number of registers the allocation instruction will allocate is determined 402.

The first process 401 of FIG. 4a may be implemented with the routine of FIG. 4b. The routine of FIG. 4b: 1) effectively searches 403 over the control flow graph of a routine looking for one or more specific functional characteristics; and 2) identifies 404 a location within the routine where an allocation instruction should be inserted into the routine. After the location is identified 404, returning to FIG. 4a, the amount of registers to be allocated at the identified location is determined 402. The sequence is then repeated until the entire routine has been searched and each applicable functional characteristic.

In the function call allocation instruction example currently being discussed, the function call allocation instruction is placed within the basic block having the function call (e.g., basic block 207 of FIG. 2). This placement corresponds to method 401 of FIG. 4a. Thus, in this example (referring to FIG. 4b), a compiler can be configured to search a routine for a function call (which corresponds to method 403) and then insert the allocation instruction just before the function call (which corresponds to method 404).

Figure 7:
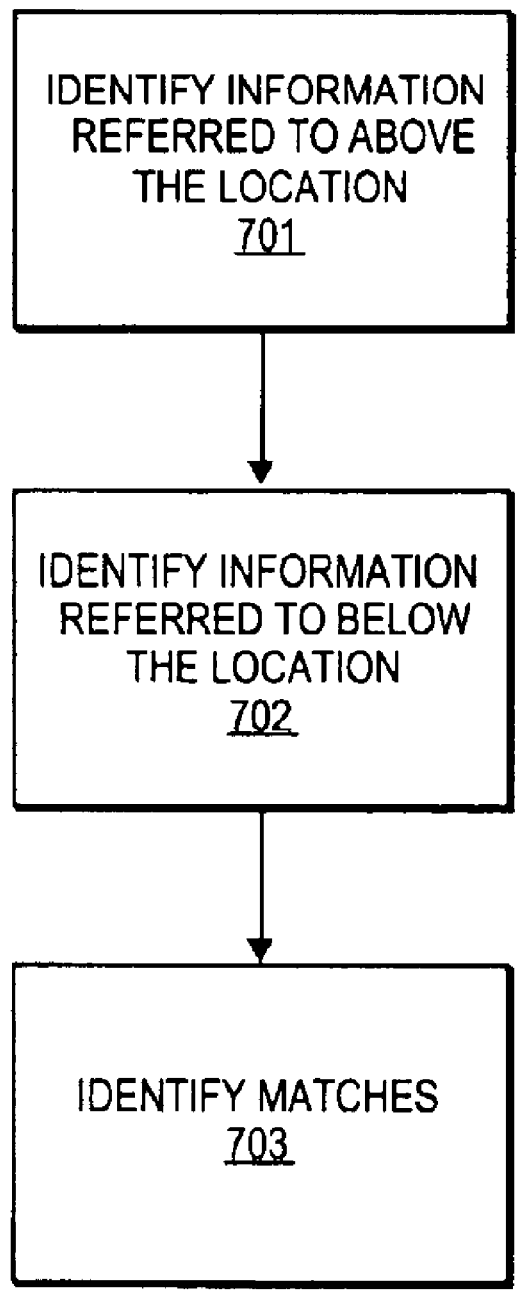
FIG. 7 shows a method that may be used to identify live information.

FIG. 7 shows a method that may be used for method 402 of FIG. 4. Recall that during method 402, the amount of registers to be allocated at the identified location is determined 402. In this case, the number of registers to be allocated corresponds to the amount of live information that exists within the caller routine at the time the function call is made.

FIG. 7 shows a method that may be used to determine the amount of live information that exists within a routine at any location within the routine. Thus, the method of FIG. 7 may be used in a location other than a basic block having a function call. In the particular example being discussed, the location corresponds to the function call (or, more precisely, just before the function call) because the function call allocation instruction is inserted just above the function call to the foobar(x,y) subroutine.

First, information that is "referred to above the location" is identified 701. Information that is "referred to" is any information that consumes register space or has been reserved to consume register space. For example, information that is actually used (such as the variables "x", "a" and "b" in the statement "x=a+b") is typically "referred to" because the actually used information (e.g., the data used for variables "x", "a" and "b") is stored in one or more registers.

The phrase "above the location" means along the one or more paths in the control flow graph that flow into the basic block where the function call allocation instruction is to be inserted. For example, referring to FIG. 2, there is only one path 270 that flows into the basic block 207 with the function call allocation instruction. Note that if basic block 208 had a function call, there would be four separate paths 270, 280, 260 and 290.

A compiler program may be designed to construct an understanding or the caller routine's data flow by utilizing the caller routine's control flow. In so doing, the different paths that flow into the basic block having the function call allocation instruction may be recognized and screened for "referred to" information. Screening for "referred to" information may be accomplished by examining the instructions within each basic block along the path(s) as to their utilization of registers for variables, or parameters, etc.

After the information that is referred to above the location is identified, the information "referred to below the location" is identified 702. The term "referred to" has the same meaning as discussed above. The term "below the location" means along the one or more paths in the control flow graph that flow from the basic block having the function call allocation instruction. For example, referring to FIG. 2, there is only one path 270 that flows from the basic block 207 with the function call allocation instruction. Note that if basic block 201 had a function call allocation instruction, there would be four separate paths 270, 280, 260 and 290.

Live information is information that is referred to both above and below the location. Thus, if the result of the first process 701 is a list of referred to variables and the result of the second process 702 is a list of referred to variables, the variables appearing on both lists (i.e., a "match" as between the two lists) correspond to the live information for the particular location being analyzed. Thus, once the information referred to above 701 and below 702 (i.e., before and after) the location is identified, live information is identified by finding the matches 703 that exist between the two groups of referred to information.

Once the live information is understood for a particular location, all other register space allocated to the caller routine is stale information which can be overwritten for the called routine as shown back in FIG. 6. Note that this includes information that is not invoked on the paths that flow into or out of the basic block having the function call allocation instruction. For example referring to FIG. 2, if basic block 207 has the location being analyzed, a variable used only by basic block 204 may be overwritten for the called function.

Recall that the terms "above the function call" and "below the function call" relate to analyzing the control flow graph paths that flow into and out of the basic block having the location being analyzed. In various embodiments, the control flow graph path analysis need only extend to the entry and exit basic blocks of the caller function.

From the perspective of a software writer, a routine frequently uses two kinds of variables or other data structures that are written to and/or read from a register. These two kinds of information are commonly referred to as local and global. From the perspective of a compiler that is compiling the caller routine, local information is used only within the caller routine (unless the local information is passed to/from another routine as an input/output of the caller routine); while global information is designed to be recognized and used not only by the caller routine but also by other subroutines as well. An example of a global variable is "real time" which keeps track of the time of day (e.g., 11:32:06 A.M.) which any routine may use to gain access to the real time of day.

From the perspective of a compiler, information which is live across a function call, (i.e. variables that are referred to before and after a function call) is global information within a function. Global information within a function should not be overwritten by a called routine. Information which is not live across a function call, is local information within a function. Local information within a function may be overwritten by a called routine, because the routine no longer refers to this information after the function call. In the following, local and global information refers to local and global information within a function respectively.

If registers holding global information within a function were allocated so as to be written over by a called routine, disruption of program operation could result. For example, if a called routine were to write over a register holding global information, the global information would not be available later in the caller routine. Thus, precautions should be taken so that global information is not overwritten by the allocation(s) performed by the called routine.

In some cases a processor's architecture may help achieve this end. For example, various processor (such as the IA-64 processor family mentioned above) have partitioned register space such that one partition may contain (global or local) information for the caller routine, which cannot be over written by a called routine. For example, the IA-64 processor family contains (at least) 96 registers which can be protected by a called routine from being overwritten by any called routine.

If a processor's architecture does not help achieve this end (e.g., a MIPS R10000, or a SUN SPARC) software conventions (which are followed by the compiler) can prevent registers with global information from being overwritten. In principle, it is possible to implement a multiple allocation instruction per routine environment on such architectures.

Referring to FIG. 6, for compiler embodiments configured to compile programs for a processor having partitioned register space as described above, register amounts 605 may correspond to those partitioned registers configured to hold local and global information within the caller routine. Register amount 610 may specifically correspond to those partitioned registers configured to hold only global information within the caller routine. By so doing, register amount 613 may correspond to those partitioned registers configured to hold local or global information within the called routine. By doing so, global information within the caller routine is not overwritten by the called routine.

For processor architectures that do not explicitly allow to protect global information within a caller routine from being overwritten by any called routine, note that a register holding global information may be allocated to the called routine if the global information within the register is first "saved" by having it stored to another register or other memory location prior to being allocated by the called routine.

To review then, the method of FIG. 7 describes a method that may be used to determine the number of registers allocated by a function call allocation instruction. In the particular example discussed above, which used the control flow graph of FIG. 2 as an exemplary caller routine, the location of the function call allocation instruction was just before the function call. This placed the instruction within the basic block 207 having the function call to foobar(x,y).

This particular example was used to isolate the ancillary advantage in which a called routine may use the caller routine's stale register resources in order to utilize on processor register space more efficiently than prior art solutions. That is, recalling that at the onset of the discussion pertaining to FIG. 6 it was mentioned that a routine having worst case allocation in the entry block and a function call allocation instruction just before the function call does not allocate register on an approximately "as needed" basis (which is another motivation for having multiple allocation instructions per routine).

It is important to point out that a function call allocation instruction may be inserted in a location other than just before the function call. For example, after a called routine responds with its function return, the caller routine may execute another allocation instruction so that caller routine instructions subsequent to the function cll are allocated for. In various cases, such as situations where a significant amount of live information exists, little advantage is gained by inserting an allocation instruction after the call (because the number of registers allocated by the allocation instructions before and after the call are about the same). However, in cases where there is little or no live information across the function call and/or where there is disproportionately heavy register usage along a particular control flow path that can be reached in the caller routine after the function call, some advantage (or at least no disadvantage) may be gained by placing one or more allocation instructions after the function call.

Figure 8A:
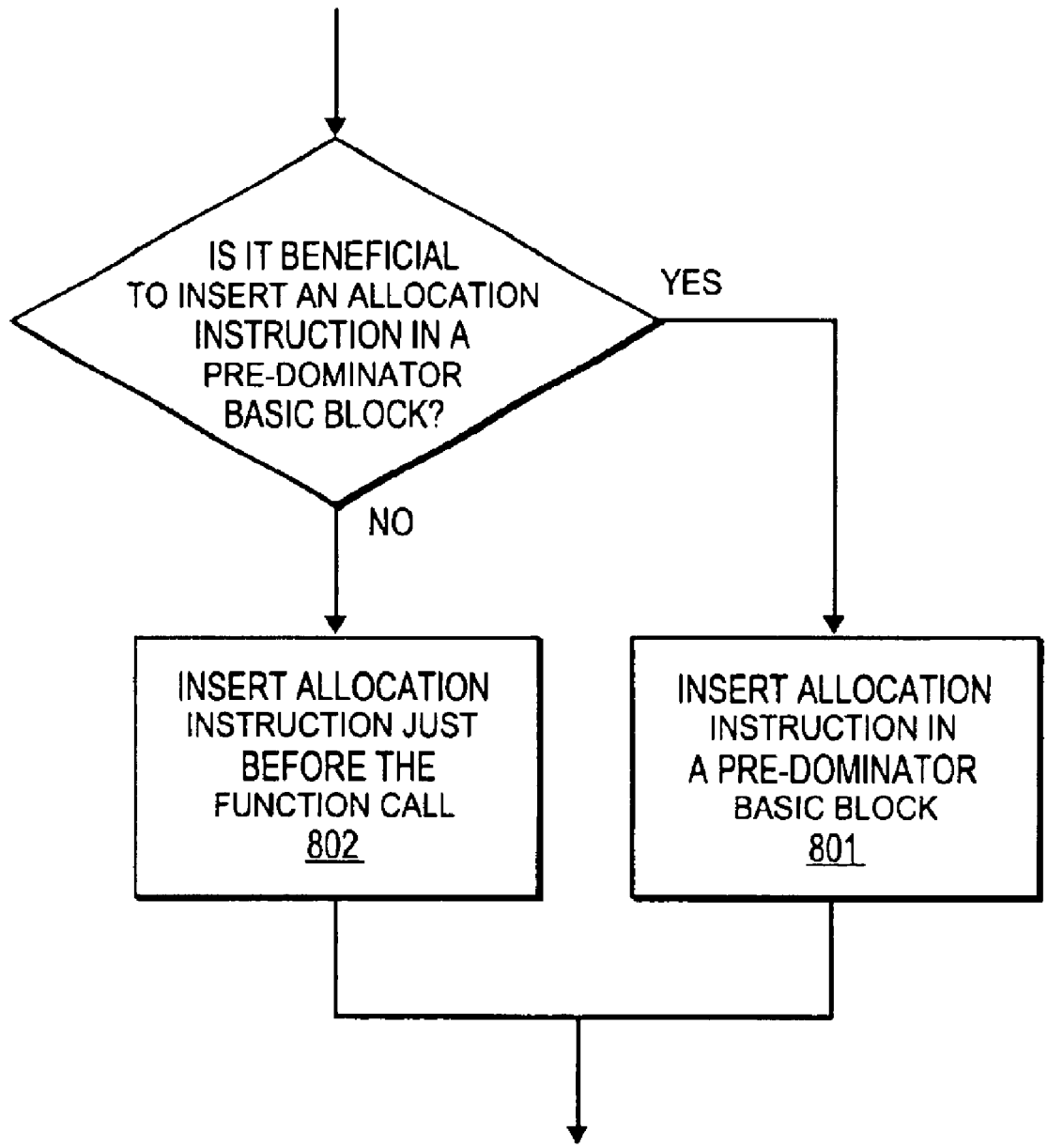
FIG. 8a shows a method for identifying the location of an allocation instruction in a pre-dominator block.
Figure 8B:
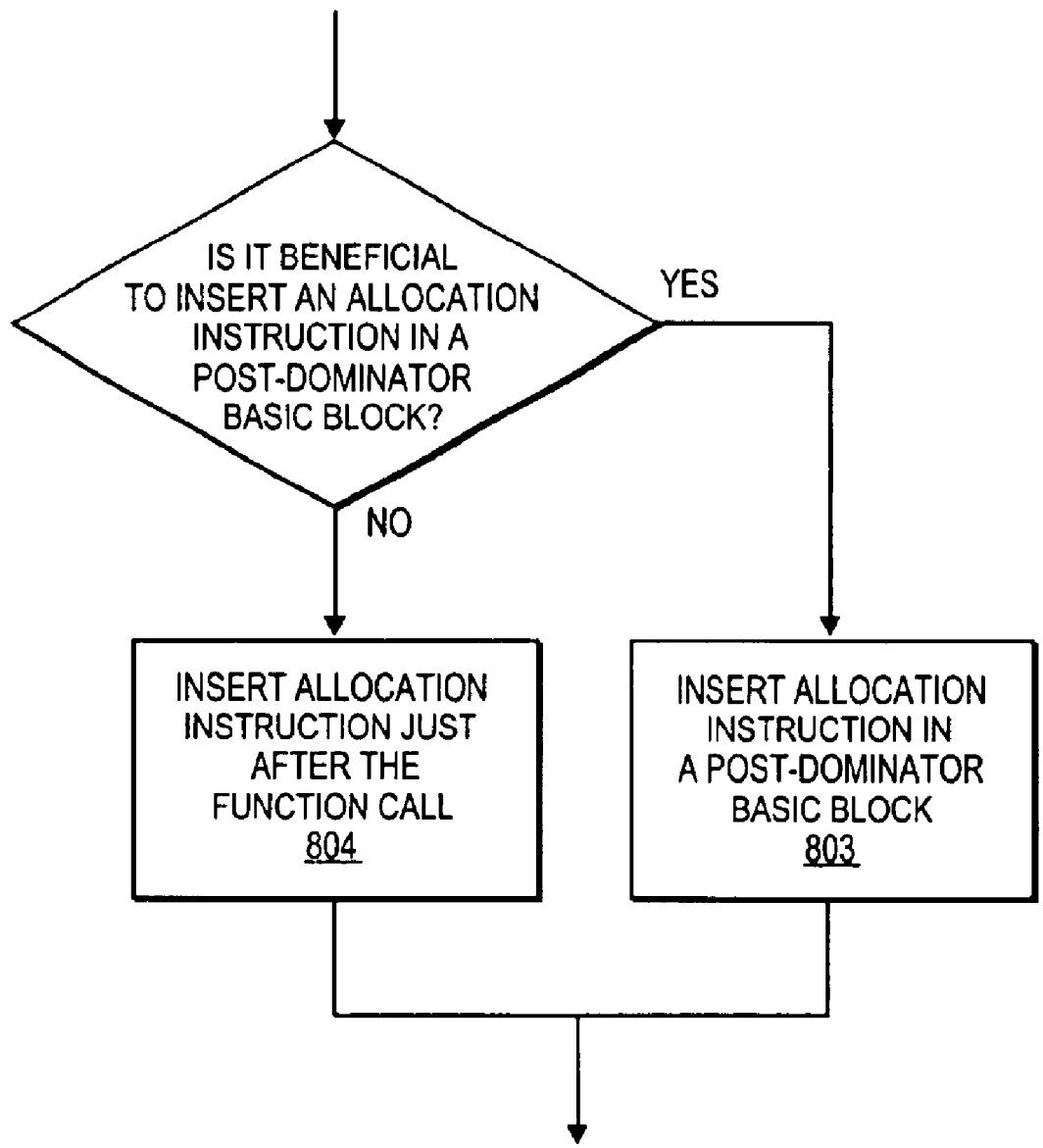
FIG. 8b shows a method for identifying the location of an allocation instruction in a post-dominator block.

FIGS. 8a and 8b show an alternative approaches that may be used for method 404 of FIG. 4b. In the method of FIG. 8a an allocation instruction is inserted in a pre-dominator (a.k.a. dominator) basic block if this is more beneficial than inserting an allocation instruction just before the function call. Whether or not it is beneficial is determined by whether or not less registers will be allocated for or if less allocation instructions will be inserted by placing the allocation instruction in a dominator.

Figure 9A:
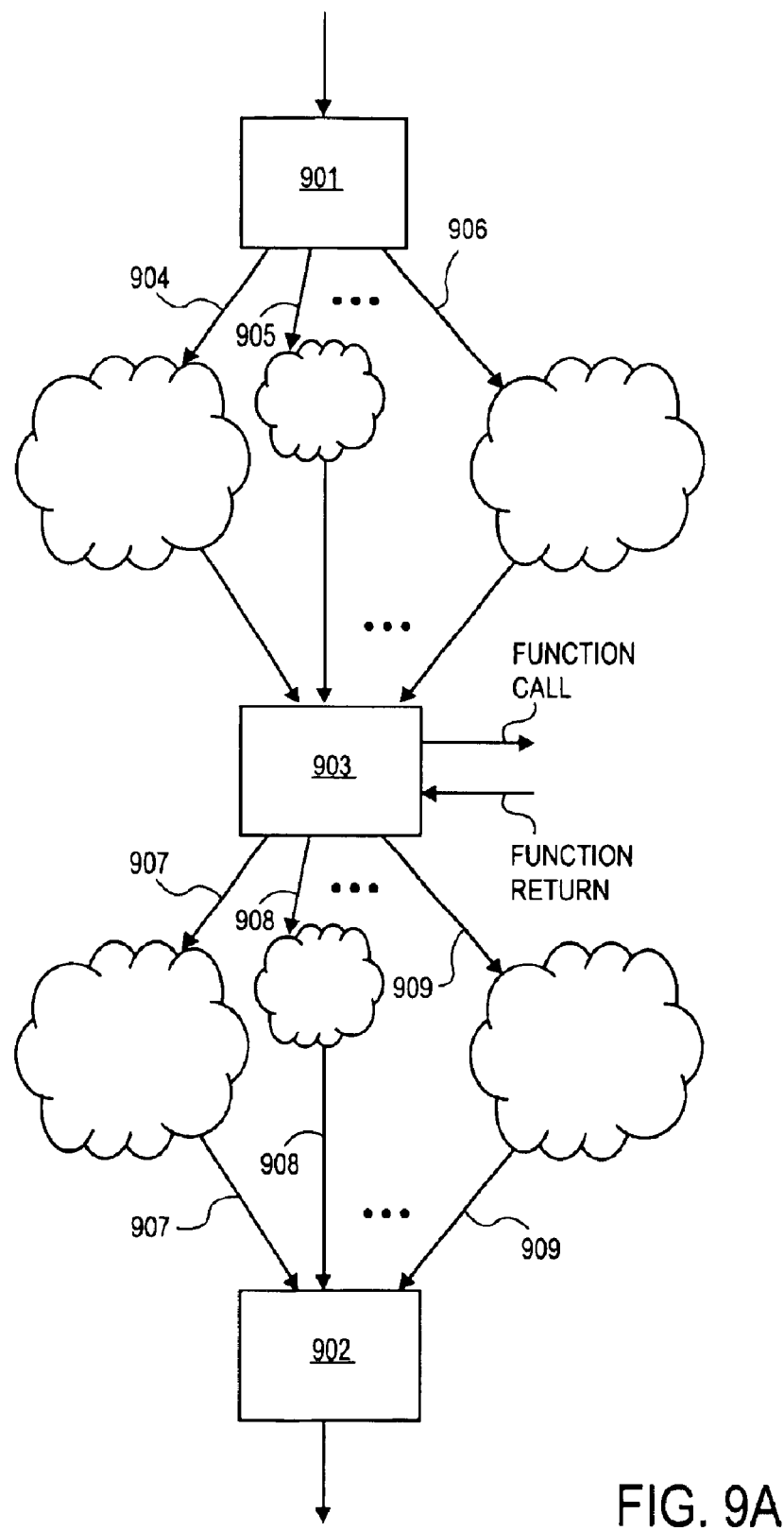
FIG. 9a shows a function call having a pre-dominator basic block and a post dominator basic block.

Referring to FIG. 9a a pre-dominator basic block 901 is a basic block having one or more emanating paths 904, 905, . . . 906 all or some of which flow into the basic block 903 having the function call. Better said, if the routine happens to follow a path that flows through basic block 903 having the function call, then (by the organization of the control flow graph) the routine has no alternative but to flow through the pre-dominator basic block 901. Thus, if the routine flows through basic block 903 having the function call, it must flow through the pre-dominator block 901 before getting to basic block 903. Note that in the example of FIG. 9a all paths emanating from the dominator block 901 flow through the block 903 having the function call. However, in other possible control flow layouts if the routine reaches a pre-dominator block 901 it may flow along a control flow path that does not flow through the block having the function call 903 (no such path is shown in FIG. 9a for simplicity).

A post-dominator basic block 902 is basic block that all control flow paths 907, 908, . . . 909 flowing out of the basic block 903 having the function call must flow through. Better said, if the routine happens to follow a path that flows through the basic block having the function call 903, then (by the organization of the control flow graph) the routine has no alternative but to flow through the post-dominator basic block 902. Thus, if the function call is made the routine flows through the post-dominator basic block 902. Note that other control flow paths (not shown in FIG. 9a) that do not emanate from the basic block 903 having the function call can also flow through the post dominator basic block 902.

In the method of FIG. 8a, an allocation instruction is inserted 801 in the pre-dominator basic block 901 if beneficial to do so. Otherwise, the allocation instruction is inserted 802 just before the function call as discussed above. Thus, the output of the method in FIG. 8a is either a location within a pre-dominator basic block 901 or a location just before the function call.

Similar, in the method of FIG. 8b, an allocation instruction is inserted 803 in the post-dominator (a.k.a. dominator) basic block 902 if it is beneficial to do so. Otherwise the allocation instruction is inserted 804 just after the function call in basic block 903. Note, again, that the insertion 803 of an allocation instruction in the post-dominator block 902 or after the function call 804 in basic block 903 may not be overly helpful if the number of registers it allocates is the same as the number of registers allocated for by the allocation instruction in the pre-dominator basic block 901 or basic block 903.

Figure 9B:
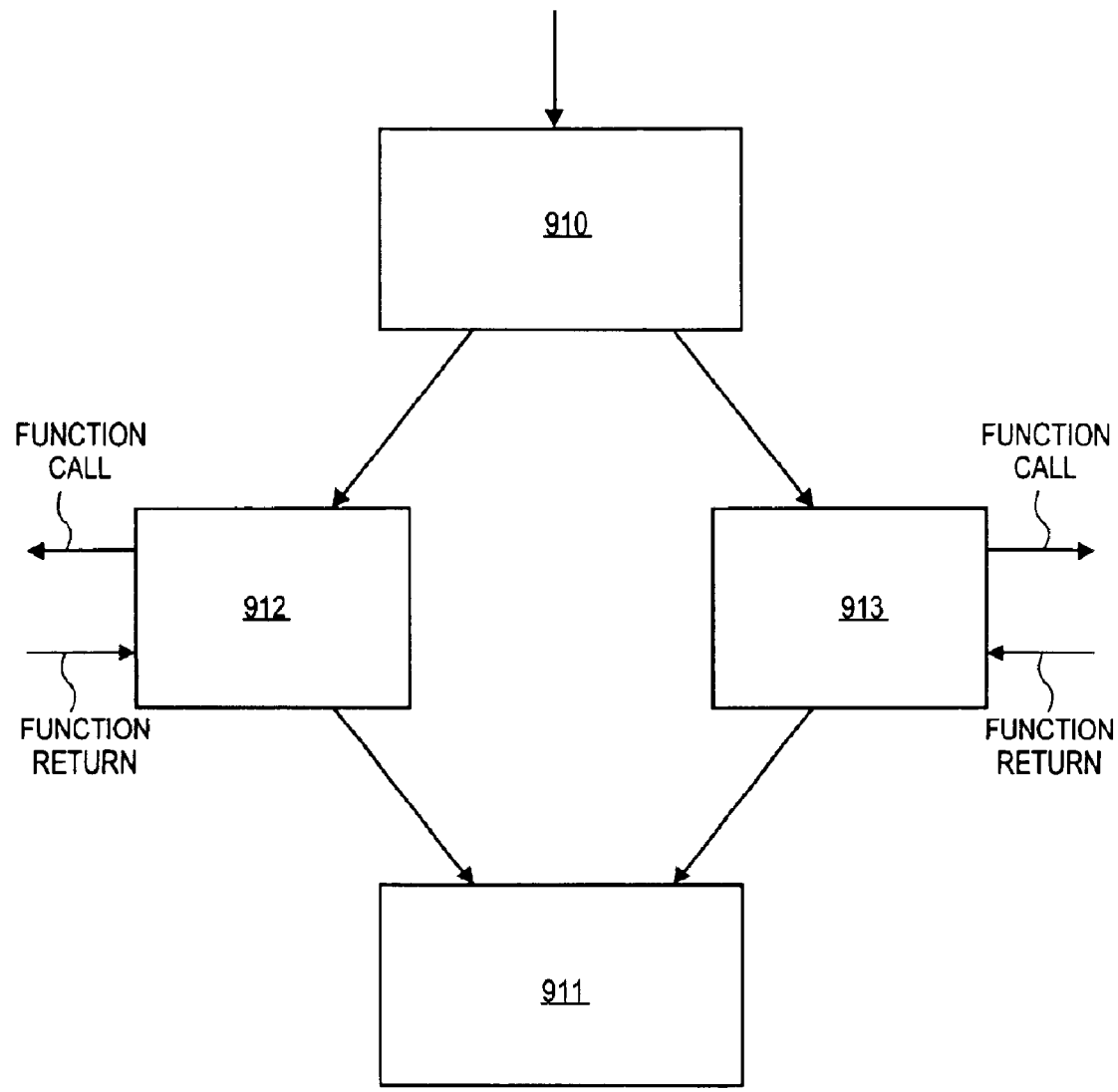
FIG. 9b shows two function calls having a common pre-dominator basic block and a common post-dominator basic block.

FIG. 9b shows a specific example when it is beneficial to both insert an allocation instruction in the pre-dominator basic block 910 and insert an allocation instruction in the post-dominator basic block 911. Using the methods in FIG. 8a and FIG. 8b, fewer allocation instructions are inserted as compared to inserting an allocation instruction before and after the function call in basic blocks 912 and 913 respectively. That is, four allocation instructions are reduced to two.

In FIG. 9b, basic blocks 912 and 913 both contain a function call. Instead of placing an allocation instruction before each function call, a function call allocation instruction is placed in the pre-dominator basic block 901 in the method of FIG. 8a. Similar, instead of placing an allocation instruction after each function call in basic block 912 and 913 respectively, an allocation instruction is placed in the post-dominator basic block 911 in the method of FIG. 8b. Thus, by recognizing more than one function call flowed from dominator block 910, two allocation instructions were reduced to one. Similarly, by recognizing more than one function call flowed into dominator block 911, two more allocation instructions were reduced to one.

Recalling that the methods of FIG. 8a and FIG. 8b may be used for the method 404 of FIG. 4b, the following procedure determines the numbers of registers to allocate as observed at method 402 of FIG. 4a. Here, the method of FIG. 7 may be used, regardless of the location used for the allocation instructions. Thus, if an allocation instruction is inserted in a pre-dominator block 901 by the method of FIG. 8a, the live information as of the pre-dominator block 901 (rather than the block having the function call 903) is allocated for by the allocation instruction. Similar, if an allocation instruction is inserted in a post-dominator block 902 by the method of FIG. 8b, the live information as of the post-dominator block 902 (rather than the block having the function call 903) is allocated for by the allocation instruction.

Placing the allocation instruction in a pre-dominator block and placing an allocation instruction in a post-dominator block allows the routine to allocate registers on an approximately "as needed" basis. As such the entry block of the active routine may allocate for less than the worst case register usage of the entire routine.

Figure 8C:
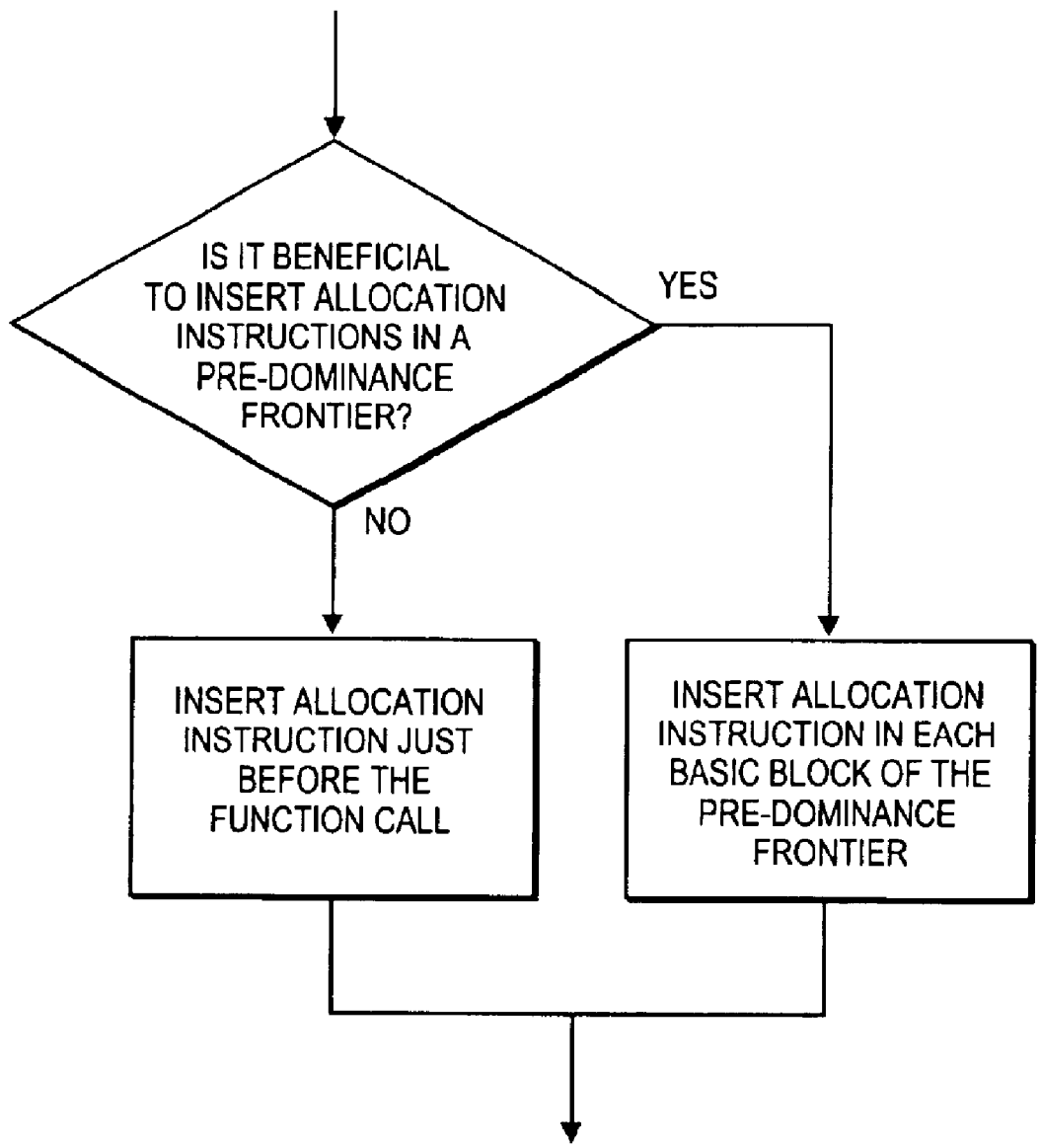
FIG. 8c shows a method for identifying the location of an allocation instruction in a pre-dominance frontier.

Another alternative approach may be used for method 404 of FIG. 4b, which is more general then the methods described in FIG. 8a and FIG. 8b. In the method of FIG. 8c, allocation instructions may be inserted in a pre dominance (a.k.a. dominance) frontier of a basic block containing a function call, if this is beneficial. Similar, in the method of FIG. 8d, allocation instructions may be inserted in a post-dominance frontier of a basic block, if this is beneficial. FIG. 9c shows an example of a portion of a control flow graph having a pre-dominance frontier consisting of basic blocks 914, 915, 916, . . . 917 above a basic block 918 having a function call. FIG. 9c also shows an example of a portion of a control flow graph having a post-dominance frontier consisting of basic block 919, 920, . . . 921 below a basic block 918 having a function call.

A pre-dominance frontier of a basic block 918 is a set of basic blocks 914, 915, 916, . . . 917 which all together control all the paths in the control flow graph of the active function, which flow into the basic block 918 having the function call. Better said, if the routine happens to follow a path that flows through basic block 918 having the function call, then (by the organization of the control flow graph) the routine has no alternative but to flow through one of the basic blocks 914, 915, 916, . . . 917 of the pre-dominance frontier of the basic block 918 having the function call. Thus, if the function call is made, the routine flows through one of the basic blocks of the pre-dominance frontier.

A post-dominance frontier of a basic block 918 is a set of basic blocks 919, 920, . . . 921 which all together control all the paths in the control flow graph of the active function, which start at basic block 918 having the function call. Better said, if the routine happens to follow a path that starts at basic block 918 having the function call, then (by the organization of the control flow graph) the routine has no alternative but to flow through (at least) one of the basic blocks 919, 920, . . . 921 of the post-dominance frontier of basic block 918. Thus, if the function call is made, the routine flows through one of the basic blocks of the post-dominance frontier.

In the method of FIG. 8c, an allocation instruction will be inserted 850 in each of the basic blocks 914, 915, 916, . . . 917 of the pre-dominance frontier of basic block 918 having the function call, if it is beneficial to do so. Similar, in the method of FIG. 8d, an allocation instruction will be inserted in each of the basic blocks 919, 920, . . . 921 of the post-dominance frontier of basic block 918 having the function call, if it is beneficial to do so.

Figure 8D:
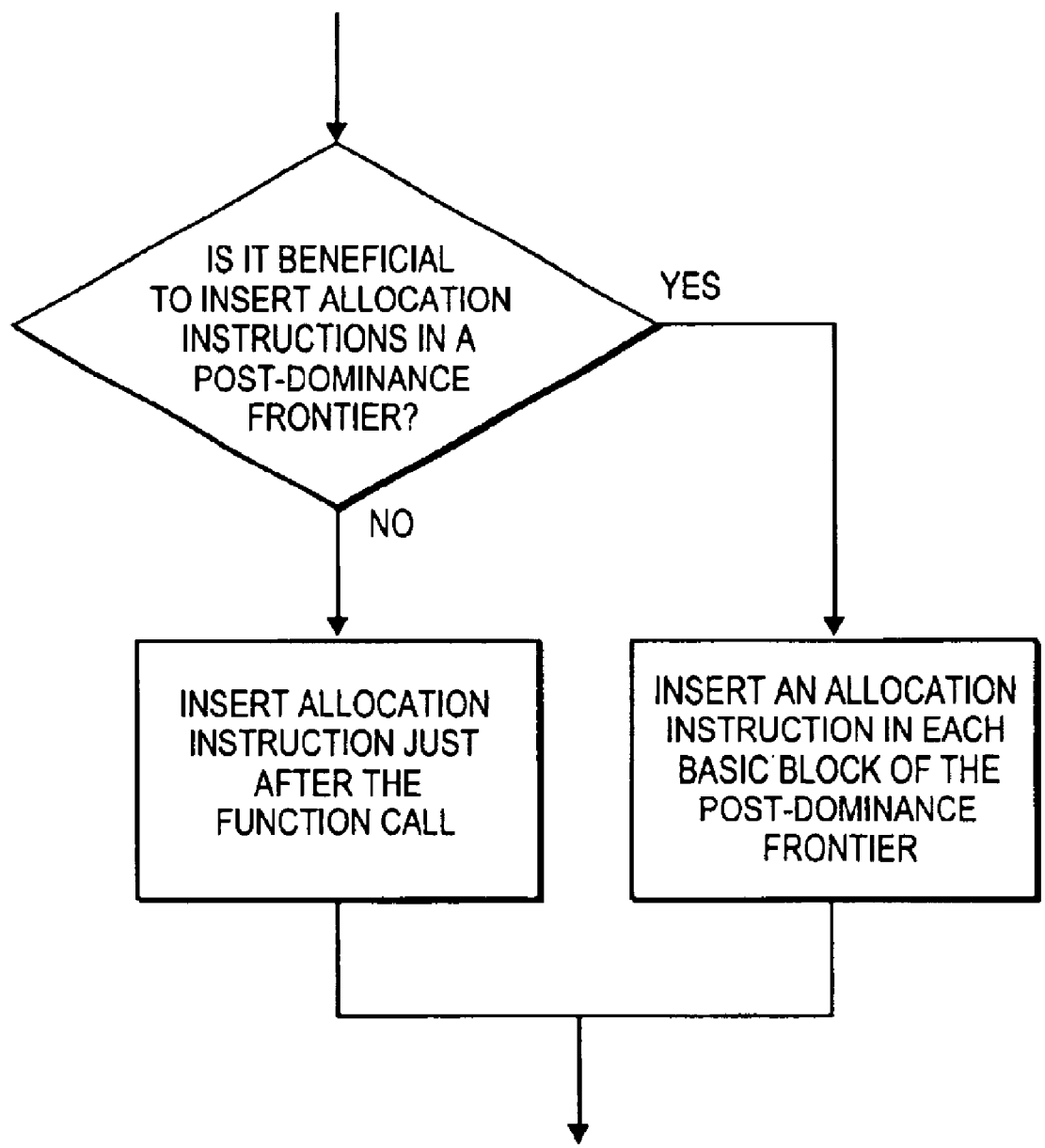
FIG. 8d shows a method for identifying the location of an allocation instruction in a post-dominance frontier.
Figure 9C:
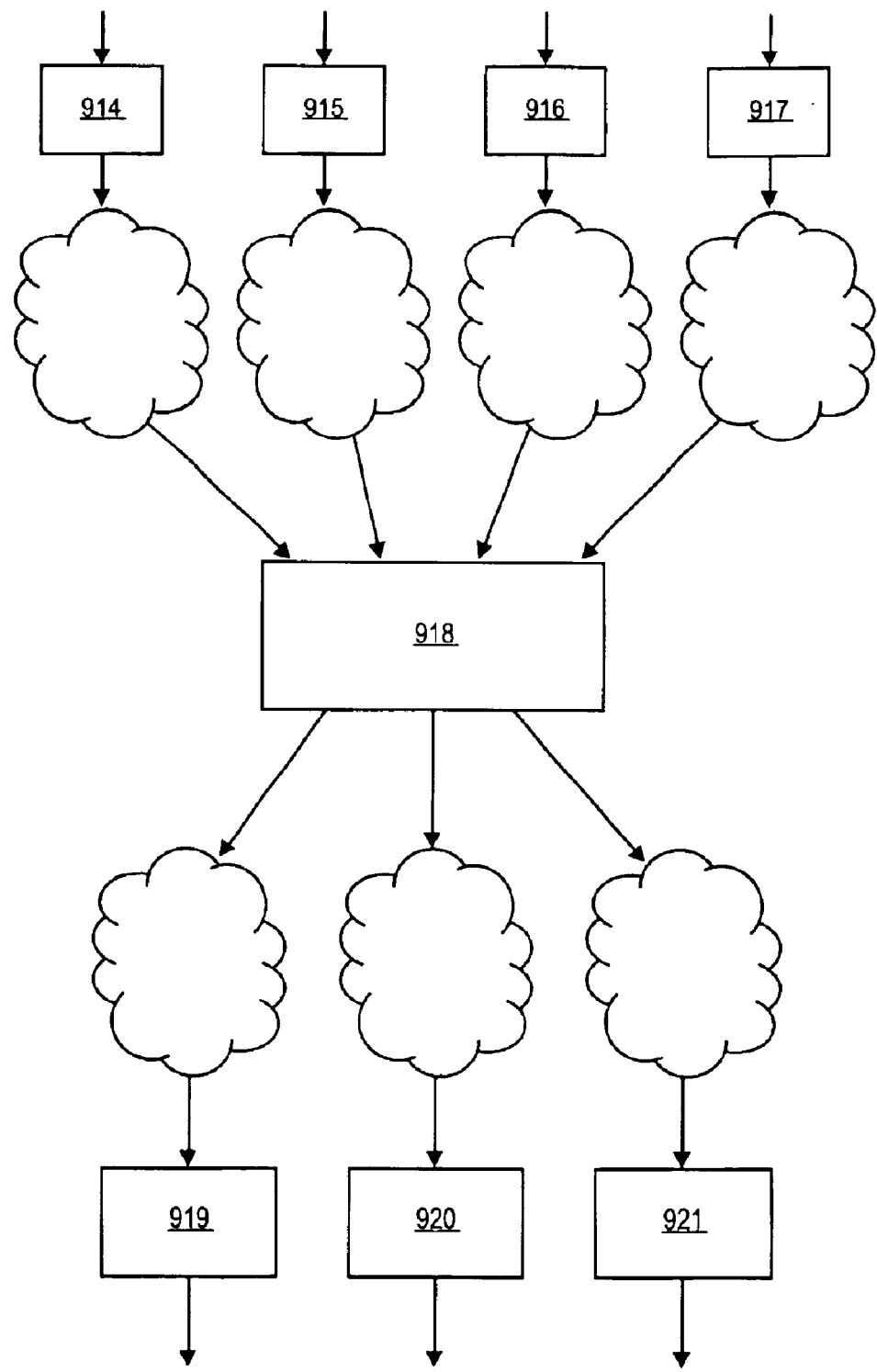
FIG. 9c shows a function call having a pre-dominance frontier and having a post-dominance frontier.

Recalling that the methods of FIG. 8c and FIG. 8d may be used for the method 404 of FIG. 4b, the following procedure will be to determine the number of registers to allocate as observed at method 403 of FIG. 4a. Here, the method of FIG. 7 may be used, regardless of the location used for the allocation instructions. Thus, if an allocation instruction is inserted 851 in each of the basic blocks 914, 915, 916, . . . 917 of the predominance frontier, the live information as of each of the basic blocks 914, 915, 916, . . . 917 (rather than before the function call in basic block 918) is allocated for by each allocation instruction. Similar, if an allocation instruction is inserted in each of the basic block 919, bx;1920, . . . 921 of the post-dominance frontier, the live information as of each of the basic block blocks 919, 920, . . . 921 (rather after function call in basic block 918) is allocated for by each allocation instruction.

Placing the allocation instructions in the pre-dominance and post-dominance frontier respectively allows the routine to allocate registers on an approximately "as needed" basis as well as utilize the ancillary advantage as discussed above. As such the entry block of the active routine may allocate for less than the worst register usage of the entire routine.

b. Loop Allocation Instruction

Figure 10:
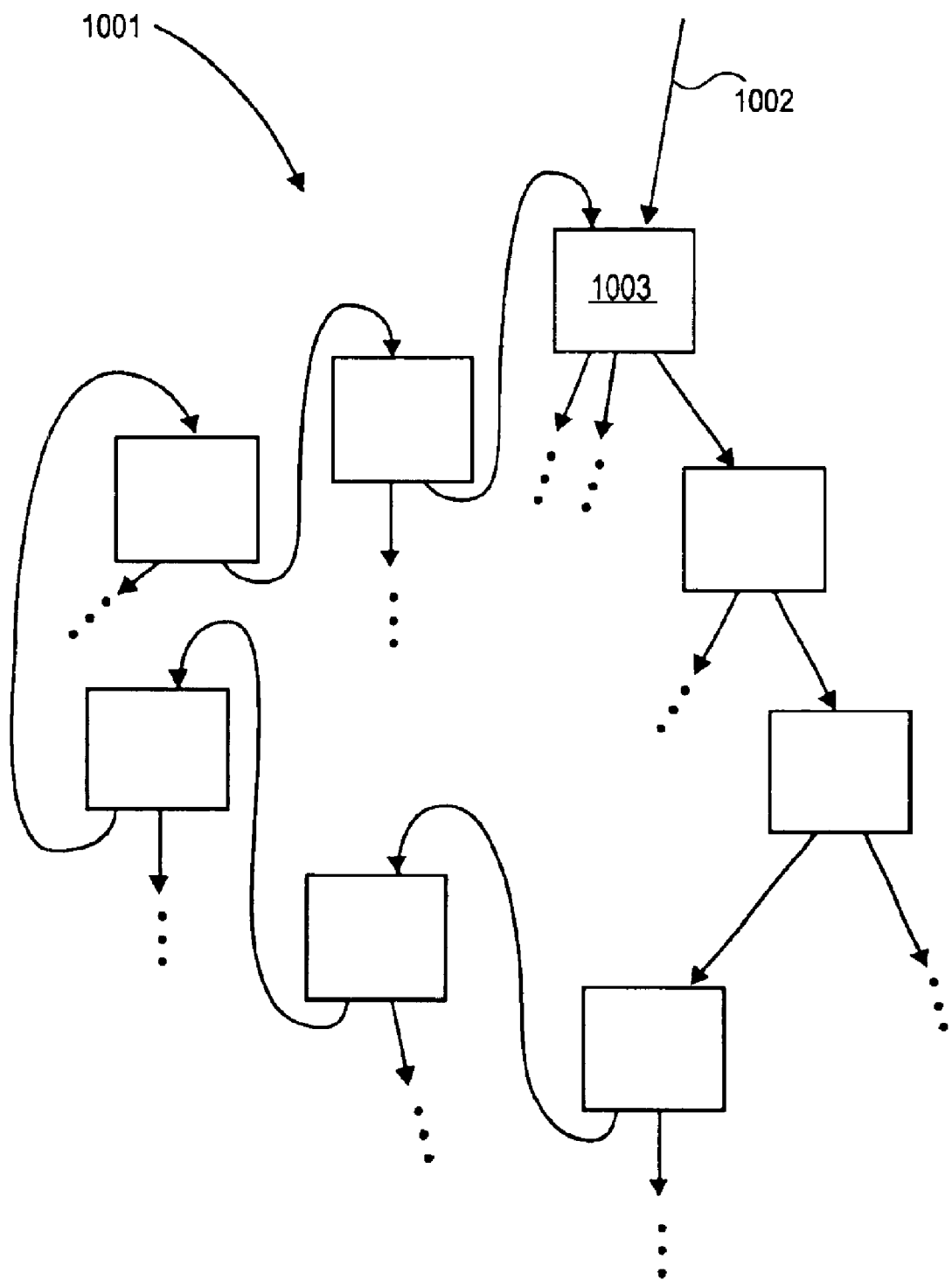
FIG. 10 shows an example of a loop within the control flow of a routine.

Recall from above that an allocation instruction placed within a basic block (other than the entry block of a routine) in light of the existence of a loop may be referred to as a loop allocation instruction. A loop is a control flow path that closes upon itself as seen in the loop 1001 example seen in FIG. 10. FIG. 10 shows a portion of a control flow graph having a loop 1001.

There is an incentive to introduce an allocation instruction above a loop because compilers apply loop transformation that tend to increase local information. Therefore loops tend to use more registers than straight line code. However, this local information usually is not needed within the active routine after the loop. Thus, referring to FIG. 4a, a compiler may be configured to search for a loop (e.g., via method 403 of FIG. 4b) and insert a loop allocation instruction above the loop (e.g., via method 404 of FIG. 4b). "Above the loop" means along a control flow path that leads into the first basic block within a loop that is executed by the routine.

For example, as seen in FIG. 10, control flow path 1002 flows into basic block 1003 which is the first basic block within the loop 1001 that the routine will execute. Thus if a loop allocation instruction is inserted in basic block 1003 (or a basic block that is executed prior to basic block 1003 along path 1002) the routine can allocate registers for the loop only if the routine happens to follow a path that enters the loop 1001. As such, the routine can allocate registers on an approximately "as needed" basis. The number of registers allocated by the loop allocation instruction should be sufficient to allocate for the entire loop (as well as additional registers as needed as the loop allocation instruction is placed higher above the loop).

c. Software Pipelined Loop Allocation Instruction

Recall from above that an allocation instruction placed within a basic block (other than the entry block of a routine) in light of the existence of a software pipelined loop may be referred to as a software pipelined loop allocation instruction. A software pipelined loop is a group of instructions that compute multiple loop iterations in parallel. Software pipelined loops tend to consume large amount of registers because they need to keep local information which is computed in one iteration and needed in a subsequent iteration in registers.

Thus there is an incentive to allocate for a software pipelined loop only if a software pipelined loop is to be executed. Referring to FIG. 4a, a compiler may be configured to search for a software pipelined loop (e.g., via method 403 of FIG. 4b) and insert a software pipelined loop allocation instruction above the software pipelined loop (e.g., via method 404 of FIG. 4b). "Above the software pipelined loop" means along a control flow path that leads into a software pipelined loop.

Figure 11:
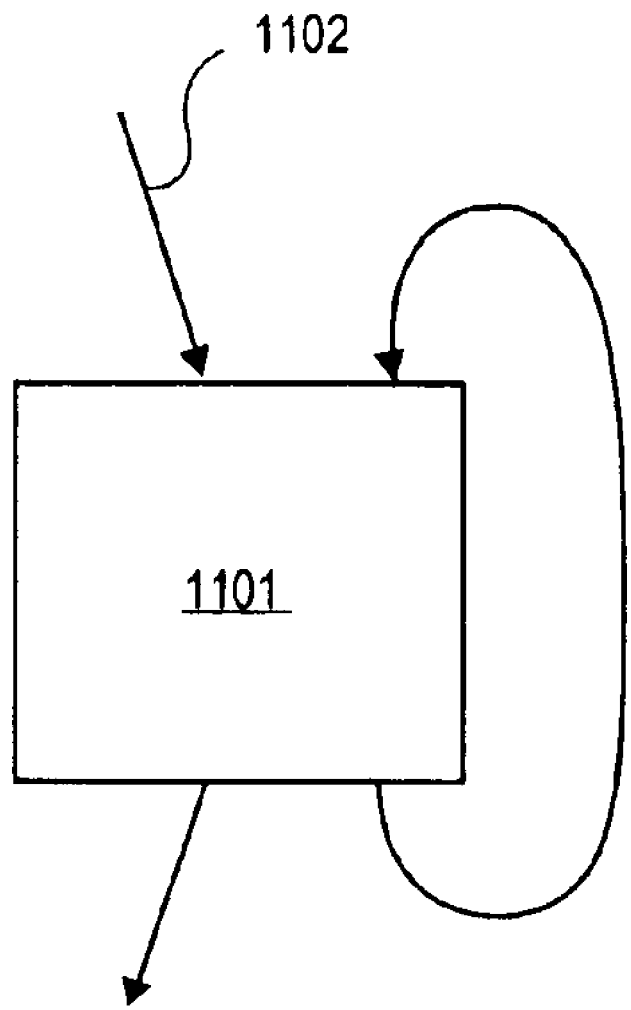
FIG. 11 shows a software pipelined loop.

For example, as seen in FIG. 11, control flow path 1102 flows into a software pipelined loop 1101. If a software pipelined loop allocation instruction is inserted just above the software pipeline loop (or within a basic block that is executed prior to the software pipelined loop along path 1102) the routine can allocate registers for the software pipelined loop if the routine happens to follow a path that enters the software pipelined loop 1101. As such, the routine can allocate registers on an approximately "as needed" basis. The number of registers allocated by the loop allocation instruction should be sufficient to allocate for the entire loop (as well as additional registers as needed as the loop allocation instruction is placed higher above the loop).

d. Allocation Instructions in Functions with Multiple Function Exits

Figure 12:
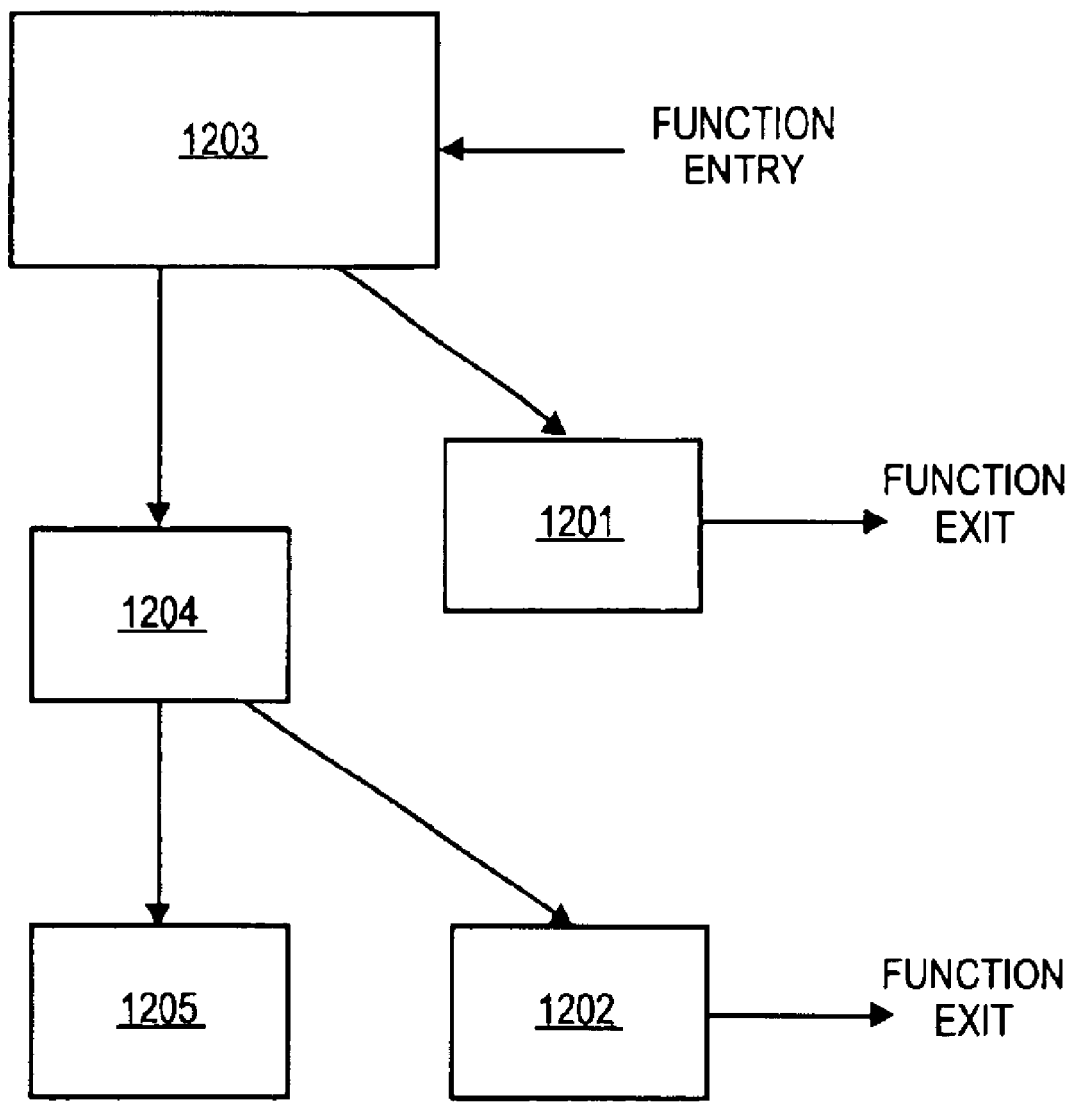
FIG. 12 shows a control flow graph having multiple function exit blocks.

FIG. 12 shows an example of a portion of a control flow graph having multiple exit basic blocks 1201 and 1202. There is an incentive to introduce an allocation instruction in a pre-dominator block of an exit block, especially if the pre-dominator block is an entry block of the routine, if the path that flows from the pre-dominator block to the exit block needs fewer registers than the rest of the routine.

In the example of FIG. 12, basic block 1203 is the entry block of the routine and a pre-dominator block of exit block 1201. Basic block 1204 is a pre-dominator block of exit block 1202 and a post-dominator block of the entry block 1203. Basic block 1205 is a post-dominator block of basic block 1204 and a pre-dominator for each of the subsequent basic blocks in the routine.

Thus, in this example, an allocation instruction may be inserted in the entry block 1203 for all the registers needed within the entry block and on all the paths from the entry block to exit block 1201. Similar, an allocation instruction may be inserted in the basic block 1204 for all the registers needed with the basic block 1204 and all the paths emanating from basic block 1204 to the exit block 1202. Finally, an allocation instruction may be inserted in the basic block 1205 to allocate the registers needed in the rest of the function, if it is necessary to do so. In all these cases, the method of FIG. 7 may be used, regardless of the location used for placing an allocation instruction.

Recall that in prior art a single allocation instruction allocates registers for the path within a routine that requires the most registers. But for function with multiple function exit blocks the method described allows to allocate registers for any path on an approximately "as needed" basis.

By inserting allocation instructions found for each function call, loop, software pipelined loop and multiple function exits found within a routine according to the techniques discussed above, a compiler can allocate registers on an approximately "as needed" basis (as well as utilize the ancillary advantage as discussed above). Note that the entry block of the routine should be configured to allocate registers for the information not allocated for by the function call allocation instruction(s) (if any), loop allocation instruction (s) (if any), and software pipelined loop allocation instruction(s) (if any).

Figure 13:
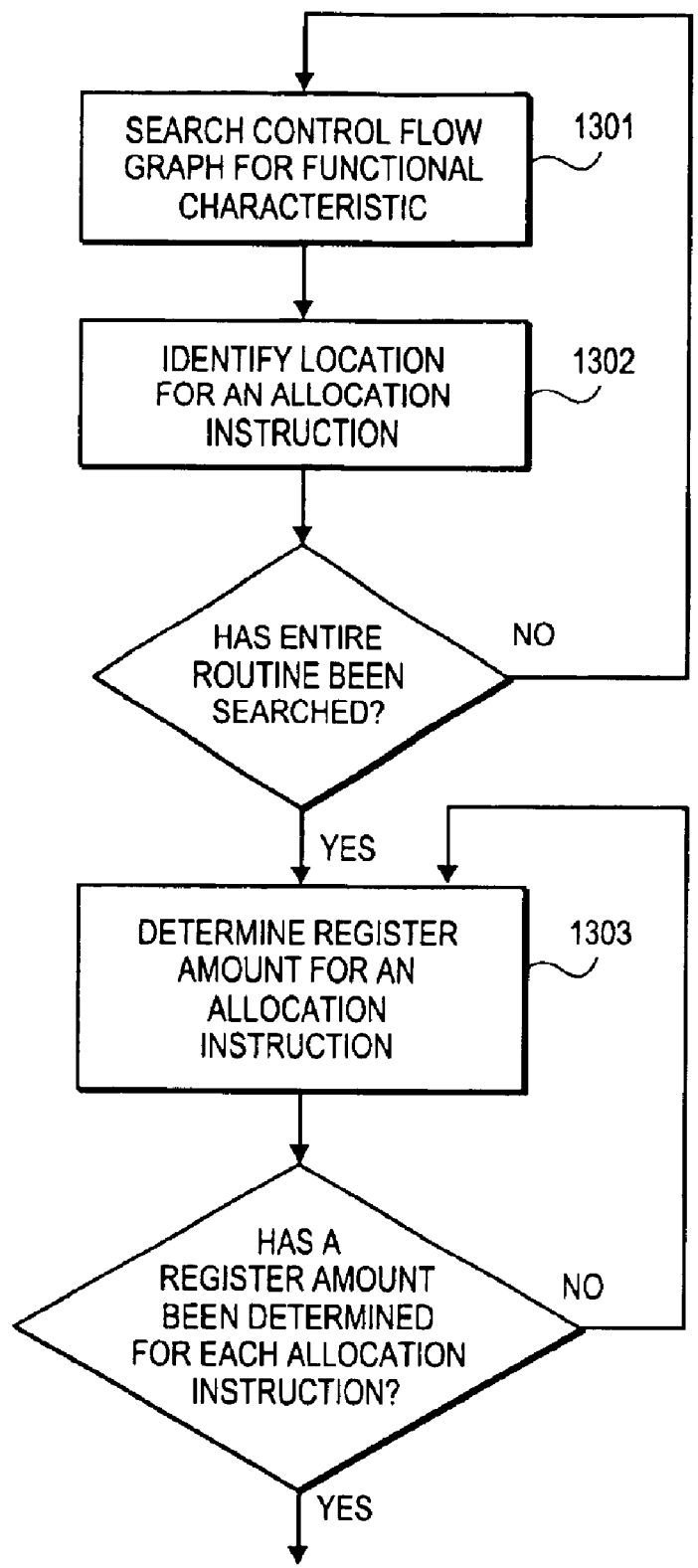
FIG. 13 shows another method that may be used to insert multiple allocation instructions within a routine.

FIG. 13 shows a method that may be used alternatively to the method of FIG. 4a. In the method of FIG. 13, the control flow graph is searched for a functional characteristic 1301 (e.g., function call, loop, software pipelined loop) and a location for a corresponding allocation instruction is identified 1302. The process is reiterated until the entire routine has been searched over. After the location for each allocation instruction to be used in the routine is understood, the compiler calculates 1303 the amount of register space for each allocation instruction. This process 1303 is reiterated until the registers that will be allocated for each allocation instruction has been defined.

The register space calculated for each allocation instruction should be sufficient to handle a worst case path to the exit block of the routine unless the allocation instruction has a post dominator block (in which case the routine need only provide enough registers for a worst case flow to the post dominator block). Note that this guideline is applicable regardless if the allocation instruction corresponds to a function call, loop or software pipelined loop or if the method of FIG. 4a or FIG. 13 is utilized.

Instruction for Multiple Allocation Instruction Environment

A prior art allocation instruction typically has a plurality of variables that are submitted along with the instruction. For example, a prior art allocation instruction for the IA-64 architecture actually reads as:

Reg_Alloc=pfs, in, stacked, out, rot where pfs, in, stacked, out, and rot are all variables used by the allocation instruction. The "in" parameter is the number of registers holding information passed to the currently active routine by a caller function. In other words, the "in" parameter is the number of parameters passed the currently active routine.

The "out" parameter corresponds to registers that are used to pass parameters to function called within the active routine. Note that in prior art "out" had to be the maximum of the parameters needed in each function call within the active routine. The method described allows for allocation of only as many "out" registers as need for a single function call within the active routine. Thus the "out" registers correspond to the live information as of a function call in an environment that employs the above described ancillary advantage.

The "stacked" parameter corresponds to the number of registers being allocated by the allocation other than the "in" and "out" registers. The "rot" parameter specifies the number of rotating registers (assuming the processor architecture supports rotating registers). Note that in prior art "rot" had to be the maximum of the rotating registers needed within the active function. The method described allows for allocation of only as many "rot" registers needed e.g. per software pipelined loop. The "pfs" parameter is the previous function state.

The previous function state is information concerning the routine that was active just before the routine having the allocation instruction became active (i.e., the caller routine in a prior art environment having only one allocation instruction at the beginning of a called routine). The pfs information includes information about the last operative state of the previously active routine so that the previously active routine may be easily revived into the same state when/if it is used again.

Thus the prior art allocation instruction above uses the pfs as an input parameter so that the pfs of the previously active routine may be stored in register space for later use. Pfs information may include, for example, the current frame maker (which describes the state of a general register), an epilogue count and a privilege level of the previously active routine.

Storing the pfs during each and every allocation instruction is useful in a prior art environment having only one allocation instruction per called routine. However, in a multiple allocation instruction environment, the pfs information has utility only for those allocation instructions appearing in the entry block of a called routine.

In a multiple allocation instruction environment, if the pfs information is stored by the allocation instruction in the entry block of a called routine, other allocation instructions within the called routine do not need to store the pfs information because it has already been stored. An allocation instruction may therefore be designed into the instruction set of a processor that supports multiple allocation instruction routines.

This allocation instruction may be configured to simply not use the pfs information as an input parameter, nor store any pfs information upon execution of the instruction. Use of such an allocation instruction allows for more efficient register usage in a multiple allocation instruction per routine environment because the register space for the pfs is saved only once rather than saved multiple times (which occurs if the prior art allocation instruction above is used).

Alternatively, a register allocation instruction that does not have a pfs parameter may be designed into the instruction set of the processor. That is, a register allocation instruction that reads as Reg_Alloc=in, stacked, out, rot may be used for register allocation instructions after the initial prior art register allocation instruction in the entry block of the routine (that uses the pfs parameter).

Further still, the prior art register allocation instruction is not necessary in a multiple allocation instruction per routine environment. The pfs information may be saved by other means (such as a "MOVE" instruction) into another register and then restored when the function return is provided.

As discussed above the methods discussed above may be performed by a compiler. A compiler is a form of software. Software, as is known in the art, is stored upon a machine readable medium. Thus, it is also to be understood that embodiments of this invention may be implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

What is claimed is:

1. A method, comprising:
   inserting an on-processor register allocation instruction within a machine code description of a routine if a function call instruction to perform a function call to another routine is found within said routine, said inserted on processor register allocation instruction to allocate less on-processor register space for the use of said routine than an amount of on-processor register space allocated for the use of said routine by another on-processor register allocation instruction that is executed prior to said inserted on processor register allocation instruction.

2. The method of claim 1 further comprising configuring said allocation instruction to allocate only for the live information that exists within said routine when said inserted allocation instruction is executed.

3. The method of claim 2 wherein said live information is determined by identifying information that is referred to before and after said function call.

4. The method of claim 3 wherein said information identified after said function call extends to an exit block of said routine.

5. The method of claim 4 wherein the worst case path to said exit block is allocated for.

6. The method of claim 3 wherein said information identified after said function call extends to a post-dominator block of said routine.

7. The method of claim 6 wherein the worst case path to said post-dominator block is allocated for.

8. The method of claim 2 wherein said live information is information that is local to said routine.

9. The method of claim 8 wherein a processor said routine is to be executed upon has its associated register space partitioned into register space used only for local information and register space used only for global information, said allocation instruction pertaining only to said register space used for local information.

10. The method of claim 2 wherein said live information includes global information.

11. The method of claim 1 wherein said allocation instruction is inserted just before a machine code representation of said function call.

12. The method of claim 1 wherein said allocation instruction is inserted in a pre-dominator basic block of said function call.

13. The method of claim 12 wherein said allocation instruction is inserted in said pre-dominator basic block of said function call if there exists a post-dominator basic block of said function call.

14. A method comprising:
    inserting an on-processor register allocation instruction within a machine code description of a routine because a functional characteristic selected from the group consisting of:

a) a loop that exists within a control flow graph of said routine;
b) a software pipelined loop; and,
c) a function call to another routine;

is discovered within said routine, said inserted on-processor register allocation instruction to allocate less on processor register space for the use of said routine than had been previously allocated for the use of said routine.

15. The method of claim 14 wherein at least one of said discovered functional characteristics includes said loop that exists within a control flow graph of said routine.

16. The method of claim 15 wherein the allocation instruction inserted for said loop is inserted above said loop in said control flow graph.

17. The method of claim 16 wherein said allocation instruction allocates for a worst case path to an exit block of said routine.

18. The method of claim 16 wherein said allocation instruction allocates for a worst case path to a post-dominator block of said routine.

19. The method of claim 14 wherein at least one of said discovered functional characteristics includes said software pipelined loop.

20. The method of claim 19 wherein the allocation instruction inserted for said software pipelined loop is inserted above said loop in said control flow graph.

21. The method of claim 20 wherein said allocation instruction allocates for a worst case path to an exit block of said routine.

22. The method of claim 21 wherein said allocation instruction allocates for a worst case path to a post-dominator block of said routine.

23. The method of claim 14 wherein said one or more functional characteristics include a function call.

24. The method of claim 14 further comprising determining the number of on-processor registers to be allocated for an allocation instruction after a functional characteristic is found.

25. The method of claim 24 wherein all functional characteristics from said group within said routine are discovered before said determining is performed.

26. The method of claim 24 wherein said determining is performed before a next functional characteristic is discovered.

27. The method of claim 14 further comprising building an understanding of said routine's control flow graph before said searching is performed.

28. A method, comprising:
performing a first allocation for a first amount of on-processor register space at the entry block of a routine, said first amount of on-processor register space for the use of said routine;
performing a second allocation for a second amount of on-processor register space for the storage of live information of said routine when said routine performs a function call to a second routine, said second amount less than said first amount;
performing said function call to said second routine; and,
performing a third allocation for a third amount of on-processor register space at the entry block of said second routine, said third amount of allocated on-processor register space for the use of said second routine and including a region of said first amount of allocated on-processor register space that stores stale information of said routine when said routine said performs said function call to said second routine.

29. The method of claim 28 wherein said live information is determined by identifying information that is referred to before and after said function call.

30. The method of claim 29 wherein said information identified after said function call extends to an exit block of said routine.

31. The method of claim 30 wherein the worst case path to said exit block is allocated for.

32. The method of claim 29 wherein said information identified after said function call extends to a post-dominator block of said routine.

33. The method of claim 32 wherein the worst case path to said post-dominator block is allocated for.

34. The method of claim 28 wherein said live information is information that is local to said routine.

35. The method of claim 34 wherein a processor said routine is to be executed upon has its associated register space partitioned into register space used only for local information and register space used only for global information, said allocation instruction pertaining only to said register space used for local information.

36. The method of claim 28 wherein said live information includes global information.

37. The method of claim 28 wherein said second allocation is performed just before said function call.

38. The method of claim 28 wherein said second allocation is performed in a pre-dominator basic block of said function call.

39. The method of claim 38 wherein said second allocation is performed in said pre-dominator basic block of said function call if there exists a post-dominator basic block of said function call.

40. The method of claim 28 further comprising compiling said routine.

41. A machine readable medium having stored thereon sequences of instructions which are executable by a digital processing system, and which, when executed by the digital processing system, cause the system to perform a method comprising:
inserting an on-processor register allocation instruction within a machine code description of a routine if a function call instruction to perform a function call to another routine is found within said routine, said inserted on processor register allocation instruction to allocate less on-processor register space for the use of said routine than an amount of on-processor register space allocated for the use of said routine by another on-processor register allocation instruction that is executed prior to said inserted on processor register allocation instruction.

42. The machine readable medium of claim 41 further comprising instructions which cause a processor that executes said routine to configure said allocation instruction to allocate only for the live information that exists within said routine when said inserted allocation instruction is executed.

43. The machine readable medium of claim 42 wherein said live information is determined by identifying information that is referred to before and after said function call.

44. The machine readable medium of claim 43 wherein said information identified after said function call extends to an exit block of said routine.

45. The machine readable medium of claim 44 wherein the worst case path to said exit block is allocated for.

46. The machine readable medium of claim 43 wherein said information identified after said function call extends to a post-dominator block of said routine.

47. The machine readable medium of claim 46 wherein the worst case path to said post-dominator block is allocated for.

48. The machine readable medium of claim 42 wherein said live information is information that is local to said routine.

49. The machine readable medium of claim 48 wherein said processor said routine is to be executed upon has its associated register space partitioned into register space used only for local information and register space used only for global information, said allocation instruction pertaining only to said register space used for local information.

50. The machine readable medium of claim 42 wherein said live information includes global information.

51. The machine readable medium of claim 41 wherein said allocation instruction is inserted just before a machine code representation of said function call.

52. The machine readable medium of claim 41 wherein said allocation instruction is inserted in a pre-dominator basic block of said function call.

53. The machine readable medium of claim 52 wherein said allocation instruction is inserted in said pre-dominator basic block of said function call if there exists a post-dominator basic block of said function call.

54. A machine readable medium having stored thereon sequences of instructions which are executable by a digital processing system, and which, when executed by the digital processing system, cause the system to perform a method comprising:
inserting an on-processor register allocation instruction within a machine code description of a routine because a functional characteristic selected from the group consisting of:
a) a loop that exists within a control flow graph of said routine;
b) a software pipelined loop; and,
c) a function call to another routine;
is discovered within said routine, said inserted on-processor register allocation instruction to allocate less on processor register space for the use of said routine than had been previously allocated for the use of said routine.

55. The machine readable medium of claim 54 wherein at least one of said discovered functional characteristics includes said loop that exists within a control flow graph of said routine.

56. The machine readable medium of claim 55 wherein the allocation instruction inserted for said loop is inserted above said loop in said control flow graph.

57. The machine readable medium of claim 56 wherein said allocation instruction allocates for a worst case path to an exit block of said routine.

58. The machine readable medium of claim 56 wherein said allocation instruction allocates for a worst case path to a post-dominator block of said routine.

59. The machine readable medium of claim 54 wherein at least one of said discovered functional characteristics includes said software pipelined loop.

60. The machine readable medium of claim 59 wherein the allocation instruction inserted for said software pipelined loop is inserted above said loop in said control flow graph.

61. The machine readable medium of claim 60 wherein said allocation instruction allocates for a worst case path to an exit block of said routine.

62. The machine readable medium of claim 61 wherein said allocation instruction allocates for a worst case path to a post-dominator block of said routine.

63. The machine readable medium of claim 54 wherein said one or more functional characteristics include a function call.

64. The machine readable medium of claim 54 further comprising sequences of instructions which cause the system to determine the number of on-processor registers to be allocated for an allocation instruction after a functional characteristic is found.

65. The machine readable medium of claim 64 wherein functional characteristics from said group within said routine are discovered before said determining is performed.

66. The machine readable medium of claim 64 wherein said determining is performed before a next functional characteristic is discovered.

67. The machine readable medium of claim 54 further comprising sequences of instructions which cause the system to build an understanding of said routine's control flow graph before said searching is performed.

68. A machine readable medium having stored thereon sequences of instructions which are executable by a digital processing system, and which, when executed by the digital processing system, cause the system to perform a method, comprising:
performing a first allocation for a first amount of on-processor register space at the entry block of a routine, said first amount of on-processor register space for the use of said routine;
performing a second allocation for a second amount of on-processor register space for the storage of live information of said routine when said routine performs a function call to a second routine, said second amount less than said first amount;
performing said function call to said second routine; and,
performing a third allocation for a third amount of on-processor register space at the entry block of said second routine, said third amount of allocated on-processor register space for the use of said second routine and including a region of said first amount of allocated on-processor register space that stores stale information of said routine when said routine said performs said function call to said second routine.

69. The machine readable medium of claim 68 wherein said live information is determined by identifying information that is referred to before and after said function call.

70. The machine readable medium of claim 69 wherein said information identified after said function call extends to an exit block of said routine.

71. The machine readable medium of claim 70 wherein the worst case path to said exit block is allocated for.

72. The machine readable medium of claim 69 wherein said information identified after said function call extends to a post-dominator block of said routine.

73. The machine readable medium of claim 72 wherein the worst case path to said post-dominator block is allocated for.

74. The machine readable medium of claim 68 wherein said live information is information that is local to said routine.

75. The machine readable medium of claim 74 wherein a processor said routine is to be executed upon has its associated register space partitioned into register space used only for local information and register space used only for global information, said allocation instruction pertaining only to said register space used for local information.

76. The machine readable medium of claim 68 wherein said live information includes global information.

77. The machine readable medium of claim 68 wherein said second allocation is performed just before said function call.

78. The machine readable medium of claim 68 wherein said second allocation is performed in a pre-dominator basic block of said function call.

79. The machine readable medium of claim 68 wherein said second allocation is performed in said pre-dominator basic block of said function call if there exists a post-dominator basic block of said function call.

80. The machine readable medium of claim 68 further comprising compiling said routine.

* * * * *